(12) United States Patent
Wei et al.

(10) Patent No.: US 11,617,223 B2
(45) Date of Patent: Mar. 28, 2023

(54) METHOD AND USER EQUIPMENT FOR SMALL DATA TRANSMISSION

(71) Applicant: FG Innovation Company Limited, Tuen Mun (HK)

(72) Inventors: Chia-Hung Wei, Taipei (TW); Hai-Han Wang, Taipei (TW); Hsin-Hsi Tsai, Taipei (TW); Heng-li Chin, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/217,123

(22) Filed: Mar. 30, 2021

(65) Prior Publication Data

US 2021/0315049 A1    Oct. 7, 2021

Related U.S. Application Data

(60) Provisional application No. 63/002,269, filed on Mar. 30, 2020.

(51) Int. Cl.
*H04W 76/27* (2018.01)
*H04W 76/36* (2018.01)
*H04W 72/14* (2009.01)

(52) U.S. Cl.
CPC .......... *H04W 76/36* (2018.02); *H04W 72/14* (2013.01)

(58) Field of Classification Search
None
See application file for complete search history.

(56) References Cited

U.S. PATENT DOCUMENTS

2018/0139778 A1\* 5/2018 Chou ................ H04W 74/006
2018/0352590 A1   12/2018 Sha et al.
2019/0254064 A1   8/2019 Islam et al.
(Continued)

FOREIGN PATENT DOCUMENTS

CN    107046707 A       8/2017
CN    113316923 A  \*    8/2021   ............. H04L 5/003
(Continued)

OTHER PUBLICATIONS

Intel, "Solution for non-IP small data transmission via SCEF", S2-152809 SA WG2 Meeting #110ah, Sophia Antipolis, France, Aug. 31-Sep. 3, 2015 (Sep. 3, 2015).
(Continued)

*Primary Examiner* — Ajit Patel
(74) *Attorney, Agent, or Firm* — ScienBiziP, P.C.

(57) ABSTRACT

A method and a User Equipment (UE) for small data transmission are provided. The method includes receiving a Radio Resource Control (RRC) release message; measuring at least one Downlink (DL) Reference Signal (RS) to obtain a measurement result; selecting a particular Configure Grant (CG) resource for small data transmission according to the measurement result; determining whether a Timing Advance (TA) value for the particular CG resource is valid for small data transmission according to (i) an amount of Reference Signal Received Power (RSRP) change of a DL RS associated with the particular CG resource and (ii) whether a TA-related timer is running; and performing small data transmission on the particular CG resource after determining that the TA value is valid.

12 Claims, 18 Drawing Sheets

(56) References Cited

U.S. PATENT DOCUMENTS

2019/0364599 A1    11/2019    Islam et al.
2020/0107369 A1*    4/2020    Jeon ...................... H04W 72/14
2020/0252967 A1*    8/2020    Ozturk ................ H04W 56/001

FOREIGN PATENT DOCUMENTS

WO    WO-2020142683 A1 *    7/2020    ........ H04W 72/1263
WO    WO-2021045786 A1 *    3/2021    ............. H04B 7/185

OTHER PUBLICATIONS

Huawei, HiSilicon, "Way forward for key issue infrequent small data transmission", S2-153150 SA WG2 Meeting #111, Chengdu, China, Oct. 19-23, 2015 (Oct. 23, 2015).
3GPP TS 38.321, "3rd Generation Partnership Project; Technical Specification Group Radio Access Network; NR; Medium Access Control (MAC) protocol specification (Release 15)", Technical Specification, V15.8.0 (Dec. 2019).
3GPP TS 38.331, "3rd Generation Partnership Project; Technical Specification Group Radio Access Network; NR; Radio Resource Control (RRC) protocol specification (Release 15)", Technical Specification, V15.8.0 (Dec. 2019).
3GPP TS 38.214, "3rd Generation Partnership Project; Technical Specification Group Radio Access Network; NR; Physical layer procedures for data (Release 15)", Technical Specification, V15.8.0 (Dec. 2019).

* cited by examiner

METHOD AND USER EQUIPMENT FOR SMALL DATA TRANSMISSION

CROSS-REFERENCE TO RELATED APPLICATION(S)

The present disclosure claims the benefit of and priority to provisional U.S. Patent Application Ser. No. 63/002,269 ("the '269 provisional"), filed on Mar. 30, 2020, entitled "Data Transmission in RRC INACTIVE State via Configured Grant." The content(s) of the '269 provisional are fully incorporated herein by reference for all purposes.

FIELD

The present disclosure is related to method and a User Equipment (UE) for small data transmission.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to a method and a User Equipment (UE) for small data transmission.

According to an aspect of the present disclosure, a method performed by a User Equipment (UE) for small data transmission is provided. The method includes receiving, when operating in a Radio Resource Control (RRC)_CONNECTED state, an RRC release message from a Base Station (BS), the RRC release message indicating at least one downlink (DL) Reference Signal (RS), at least one Configured Grant (CG) resource and information indicating an association between the at least one DL RS and the at least one CG resource; transitioning to an RRC_INACTIVE state in response to receiving the RRC release message; initiating an attempt for the small data transmission; measuring the at least one DL RS to obtain a measurement result; selecting, from the at least one CG resource, a particular CG resource for the small data transmission according to the measurement result; determining whether a Timing Advance (TA) value for the particular CG resource is valid for the small data transmission according to (i) an amount of Reference Signal Received Power (RSRP) change of a DL RS associated with the particular CG resource, the DL RS being one of the at least one DL RS, and (ii) whether a TA-related timer is running; performing the small data transmission on the particular CG resource after determining that the TA value is valid, wherein: the TA-related timer defines a time interval during which the TA value is allowed to be determined as valid; the TA-related timer is configured by a TA-related timer configuration provided by the BS; the TA-related timer is started when the TA value is received; and the at least one CG resource is released when the TA-related timer expires.

According to another aspect of the present disclosure, a UE is provided. The UE includes a processor and a memory coupled to the processor. The memory stores at least one computer-executable program that, when executed by the processor, causes the processor to receive, when operating in an RRC_CONNECTED state, an RRC release message from a BS, the RRC release message indicating at least one DL RS, at least one CG resource and information indicating an association between the at least one DL RS and the at least one CG resource; transition to an RRC_INACTIVE state in response to receiving the RRC release message; initiate an attempt for the small data transmission; measure the at least one DL RS to obtain a measurement result; select, from the at least one CG resource, a particular CG resource for the small data transmission according to the measurement result; determine whether a Timing Advance (TA) value for the particular CG resource is valid for the small data transmission according to (i) an amount of RSRP change for the particular CG resource is valid for the small data transmission according to (i) an amount of Reference Signal Received Power (RSRP) change of a DL RS associated with the particular CG resource, the DL RS being one of the at least one DL RS, and (ii) whether a TA-related timer is running; perform the small data transmission on the particular CG resource after determining that the TA value is valid, wherein: the TA-related timer defines a time interval during which the TA value is allowed to be determined as valid; the TA-related timer is configured in a TA-related timer configuration provided by the BS; the TA-related timer is started when the TA value is received; and the at least one CG resource is released when the TA-related timer expires.

BRIEF DESCRIPTION OF THE DRAWINGS

Aspects of the present disclosure are best understood from the following detailed disclosure when read with the accompanying figures. Various features are not drawn to scale. Dimensions of various features may be arbitrarily increased or reduced for clarity of discussion.

DESCRIPTION

Figure 1:
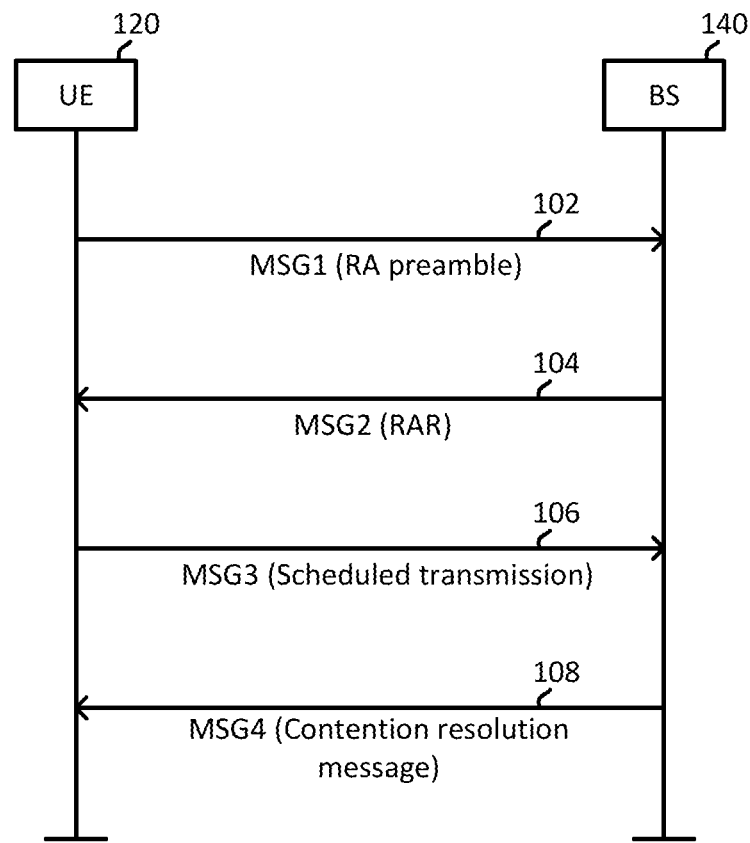
FIG. 1 illustrates 4-step Contention Based Random Access (CBRA) according to an implementation of the present disclosure.

The acronyms mentioned in the present disclosure are defined as follows. Unless otherwise specified, the terms in the present disclosure have the following meanings.

| Abbreviation | Full name |
| --- | --- |
| 3GPP | 3rd Generation Partnership Project |
| AS | Access Stratum |
| BFR | Beam Failure Recovery |
| BSR | Buffer Status Report |
| BFD | Beam Failure Detection |
| BWP | Bandwidth Part |
| CCCC | Common Control Channel |
| CCCH | Common Control Channel |
| CSI-RS | Channel State Information Reference Signal |
| CBRA | Contention Based Random Access |
| CFRA | Contention Free Random Access |
| C-RNTI | Cell Radio Network Temporary Identifier |
| CS-RNTI | Configured Scheduling Radio Network Temporary Identifier |
| CRC | Cyclic Redundancy Check |
| CORESET | Control Resource Set |
| CSS | Common Search Space |
| DC | Dual Connectivity |
| DCI | Downlink Control Information |
| DL | Downlink |
| DG | Dynamic Grant |
| DL-SCH | Downlink Shared Channel |
| DRB | Data Radio Bearer |
| DRX | Discontinuous Reception |
| DTCH | Dedicated Traffic Channel |
| E-UTRA | Evolved Universal Terrestrial Radio Access |
| EN-DC | E-UTRA NR Dual Connectivity |
| HARQ | Hybrid Automatic Repeat Request |
| ID | Identifier |
| IE | Information Element |
| I-RNTI | Inactive Radio Network Temporary Identity |
| LCH | Logical Channel |
| LCP | Logical Channel Prioritization |

-continued

| Abbreviation | Full name |
| --- | --- |
| LCID | Logical Channel Identity |
| LBT | Listen Before Talk |
| M&A | Multiplexing and Assembly |
| MAC | Medium Access Control |
| MAC CE | Medium Access Control Control Element |
| MCS | Modulation Coding Scheme |
| MCS-C-RNTI | Modulation Coding Scheme Cell Radio Network Temporary Identifier |
| MSGA | Message A |
| MSGB | Message B |
| MSG1 | Message 1 |
| MSG2 | Message 2 |
| MSG3 | Message 3 |
| MSG4 | Message 4 |
| MSGB-RNTI | Message B Radio Network Temporary Identifier |
| MIB | Master Information Block |
| NR | New Radio |
| NDI | New Data Indicator |
| NR-U | NR-Unlicensed |
| PCell | Primary Cell |
| PHY | Physical |
| PHR | Power Headroom Report |
| PDCCH | Physical Downlink Control Channel |
| PDU | Protocol Data Unit |
| PDCP | Packet Data Convergence Protocol |
| PRACH | Physical Random Access Channel |
| P-RNTI | Paging Radio Network Temporary Identity |
| PUSCH | Physical Uplink Shared Channel |
| RA | Random Access |
| RAN | Radio Access Network |
| RAR | Random Access Response |
| RLC | Radio Link Control |
| RS | Reference Signal |
| RSRP | Reference Signal Received Power |
| RNTI | Radio Network Temporary Identity |
| ROHO | Robust Header Compression |
| RRC | Radio Resource Control |
| SCell | Secondary Cell |
| SDAP | Service Data Adaptation Protocol |
| SIB | System Information Block |
| SLIV | Start and Length Indicator Value |
| SUL | Supplementary UL |
| SS | Synchronization Signal |
| SSB | Synchronization Signal Block |
| SRB | Signaling Radio Bearer |
| SFN | System Frame Number |
| TA | Timing Advance |
| TAG | Timing Advance Group |
| TB | Transport Block |
| TS | Technical Specification |
| UL | Uplink |
| USS | UE-specific Search Space |

The following contains specific information pertaining to example implementations in the present disclosure. The drawings and their accompanying detailed disclosure are directed to merely example implementations of the present disclosure. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a specific feature, structure, or characteristic, but not every possible implementation of the present disclosure necessarily includes the specific feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the specific feature, structure, or characteristic, and should instead be understood to mean "at least some implementations of the present disclosure" includes the stated specific feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the disclosed combination, group, series, and the equivalent. The terms "system" and "network" in the present disclosure may be used interchangeably.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. The character "/" used herein generally represents that the former and latter associated objects are in an "or" relationship.

Additionally, for a non-limiting explanation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will recognize that any network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Applications Specific Integrated Circuitry (ASIC), programmable logic arrays, and/or using one or more Digital Signal Processors (DSPs). Although some of the example implementations disclosed are oriented to software installed and executing on computer hardware, alternative example implementations implemented as firmware or as hardware or combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) may typically include at least one Base Station (BS), at least one UE, and one or more optional network elements that provide connection towards a network. The UE may communicate with the network (e.g., a Core Network (CN), an Evolved Packet Core (EPC) network, an Evolved Universal Terrestrial Radio Access Network (E-UTRAN), a Next-Generation Core (NGC), or an Internet), through a Radio Access Network (RAN) established by the BS.

A UE according to the present disclosure may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE may be configured to receive and transmit signals over an air interface to one or more cells in an RAN.

A BS according to the present disclosure may include, but is not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols mentioned previously.

The BS may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3$^{rd}$ Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the network dynamics of NR. Besides, an SL resource may also be provided in an NR frame to support ProSe services.

Different Types of RA Procedures

In addition to 4-step RA procedures, 2-step RA procedures are also supported in the next generation cellular wireless communication system (e.g., 3GPP NR wireless communication system). The following three types of RA procedures may be supported in the next generation cellular wireless communication system: 4-step CBRA, 2-step CBRA, and CFRA. Details on the three types of RA procedures are described with reference with FIGS. 1, 2, 3 and 4.

FIG. 1 illustrates 4-step CBRA according to an implementation of the present disclosure. In action 102, a UE 120 may transmit an MSG1 including an RA preamble to a BS 140. In action 104, the BS 140 may transmit an MSG2 (e.g., an RAR) to the UE 120 in response to receiving the MSG1. In action 106, the UE 120 may transmit an MSG3 to the BS 140 in a scheduled transmission (e.g., scheduled by the RAR). In action 108, the UE 120 may receive an MSG4 (e.g., including a contention resolution message) from the BS 140.

Figure 2:
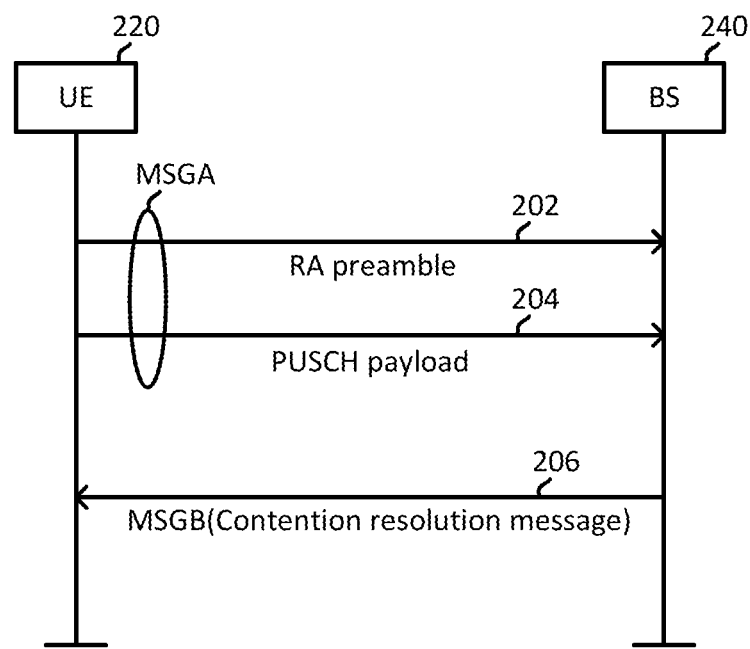
FIG. 2 illustrates 2-step CBRA according to an implementation of the present disclosure.

FIG. 2 illustrates 2-step CBRA according to an implementation of the present disclosure. In action 202, an RA preamble may be transmitted by the UE 220. In action 204, a PUSCH payload may be transmitted by the UE 220. It is noted that action 202 together with action 204 may be considered an MSGA transmission. That is, the MSGA transmission of the 2-step CBRA may include a preamble transmission on a PRACH and a payload transmission on a PUSCH. After the MSGA transmission, the UE 220 may monitor, within a configured window, an MSGB that includes a contention resolution message from the BS 204. If the contention resolution is successful upon the UE 220 receiving the MSGB in action 206, the UE may end the 2-step CBRA procedure.

Figure 3:
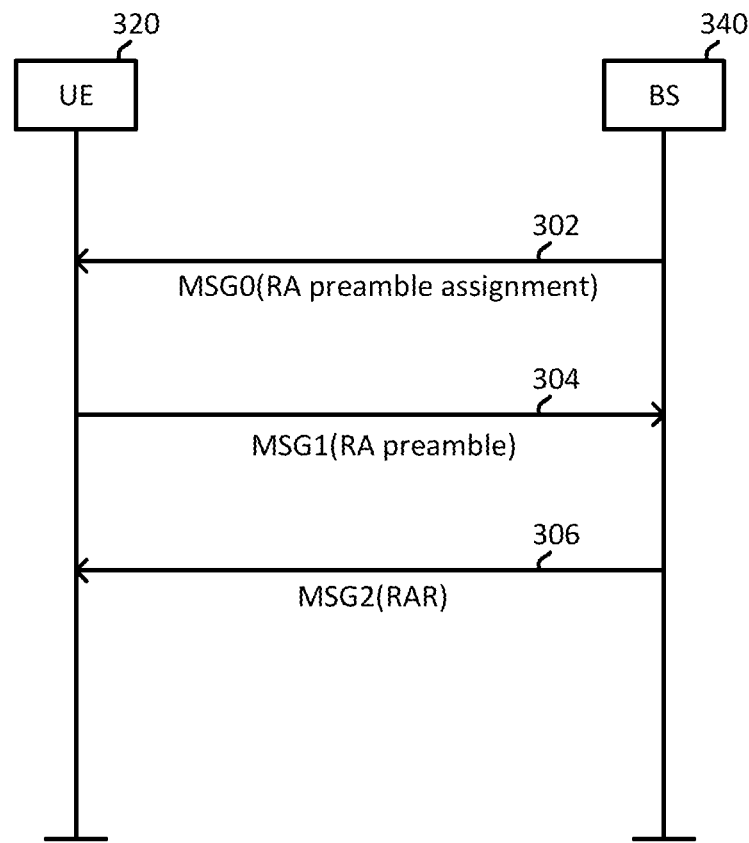
FIG. 3 illustrates Contention Free Random Access (CFRA) according to an implementation of the present disclosure.

FIG. 3 illustrates CFRA according to an implementation of the present disclosure. As illustrated in FIG. 3, a UE 320 may receive an RA preamble assignment (e.g., via an MSG0) from a BS 340 in action 302. The RA preamble assignment may indicate a resource allocation of an RA preamble transmission. The UE 320 may transmit an MSG1 (e.g., including an RA preamble) according to the indicated resource allocation in action 304. In action 306, the UE 320 may receive an MSG2 (e.g., an RAR) as a response to the MSG1.

Figure 4:
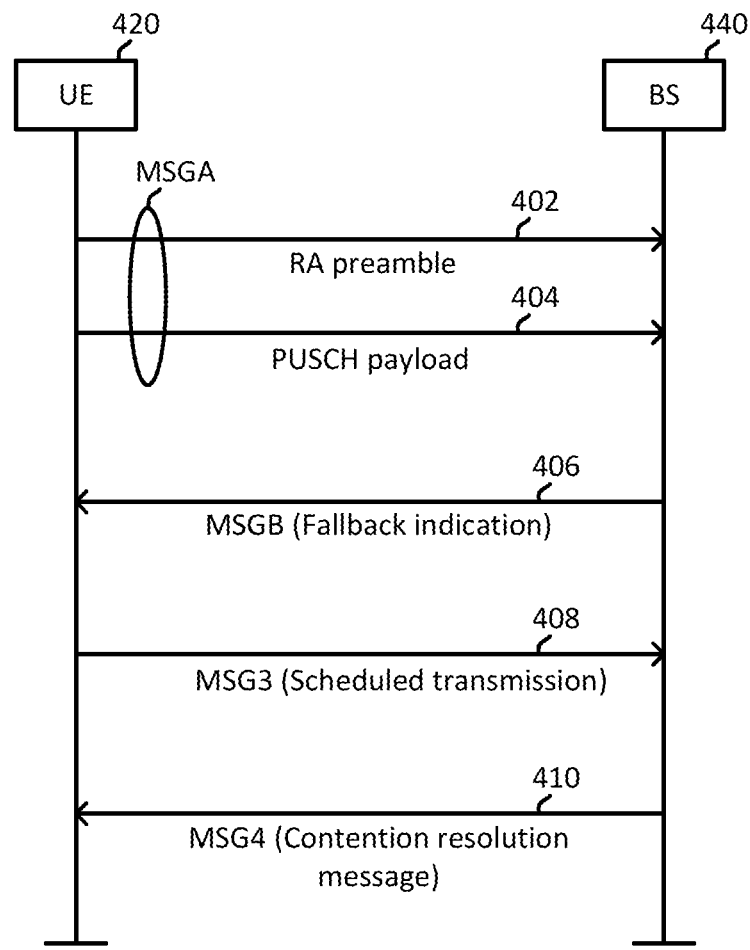
FIG. 4 illustrates a process of fallback from a 2-step Random Access (RA) procedure to a 4-step RA procedure according to an implementation of the present disclosure.

FIG. 4 illustrates a process of fallback from a 2-step RA procedure to a 4-step RA procedure according to an implementation of the present disclosure. The process may be achieved by including a fallback indication in an MSGB. As illustrated in FIG. 4, a UE 420 may transmit an RA preamble and a PUSCH payload to a BS 440 in actions 402 and 404, respectively. If the UE 420 receives a fallback indication in the MSGB in action 406, the UE 420 may perform an MSG3 transmission in action 408 and monitor an MSG4 (a contention resolution message) in action 410. After performing the MSG3 (re)transmission for a certain number of times, the UE 420 may go back to performing MSGA transmission if the contention resolution is not successful. If the 2-step RA procedure is not successfully completed after a configured number of MSGA transmissions, the UE 420 may switch to performing a 4-step CBRA procedure.

For an RA procedure performed with a serving cell configured with an SUL carrier, the BS may explicitly indicate to the UE which carrier to use (e.g., an UL carrier or an SUL carrier). Otherwise, the UE may select the SUL carrier to use if the measured quality of the DL is lower than a threshold broadcast by the BS. The UE may perform the carrier selection before the selection of 2-step RA and 4-step RA. Once started, all UL transmissions of the RA procedure may remain on the selected carrier.

Configured Grant

In a 3GPP NA wireless communication system, a gNB may dynamically allocate UL resources to a UE via a UE-specific RNTI (e.g., C-RNTI) on a PDCCH. The UE may periodically monitor the PDCCH(s) in order to find possible grants for UL transmission.

Different from the DG mechanism described previously, a gNB may preconfigure a UE with periodic UL resources on PUSCHs via CGs. Two types of CGs, i.e., CG Type1 and CG Type 2, are provided as follows:

CG Type 1: a gNB may provide the CG (including the periodicity of CG resources) via DL RRC signaling and the CG is considered valid for transmission when the UE receives the CG and the corresponding reconfiguration is finished. A valid CG may mean that this CG can be applied by the UE for UL transmission. As used herein, a CG resource may refer to a PUSCH resource, and a CG may be referred to as a CG configuration. The term "CG" and the term "CG configuration" may be utilized interchangeably in the present disclosure.

CG Type 2: a gNB may provide the CG (including the periodicity of CG resources) via DL RRC signaling. The CG may be considered valid upon the UE receiving activation signaling from the gNB until the UE receives deactivation signaling from the gNB. The activation signaling and the deactivation signaling may be PHY signaling. For example, the activation signaling and the deactivation signaling may be transmitted on a PDCCH addressed to a CS-RNTI.

In NR, three RRC states are supported: RRC_CONNECTED state, RRC_IDLE state and RRC_INACTIVE state. A UE (or the RRC layer of the UE) may operate in one of the three RRC states. Except for an UL data transmission performed during an RA procedure, an UL data transmission is generally only allowed to be performed by the UE in the RRC_CONNECTED state. As described herein, a UL data transmission may refer to a process in which a UE transmits data to a BS (e.g., gNB) on a PUSCH or other physical UL channel(s). In a legacy RA procedure introduced in LTE, the MSGA or MSG3 can only carry small and limited amount of data, since the PUSCH resource allocated by the gNB for the MSGA/MSG3 transmission is primarily for transmitting data from a Common Control Channel (CCCH) (e.g., data from the RRC layer). If a UE needs to transmit UL data (which is not from a CCCH) to the gNB and the UE is not in the RRC_CONNECTED state (i.e., operates in the RRC_IDLE state or the RRC_INACTIVE state), even if the amount of data is small, the UE still needs to trigger and perform an RRC connection establishment procedure or an RRC connection resume procedure to transition to the RRC CONNECTED state to transmit the data. Therefore, infrequent small UL data transmission by the UE may result in considerable power consumption due to the signaling overhead applied for the RRC state transition. For saving the power consumption of a UE, it may be beneficial to allow a UE to perform, without transitioning to the RRC_CONNECTED state, UL transmission (for transmitting (small) data received from an LCH associated with an SRB or a DRB) in the RRC INACTIVE state or the RRC_IDLE state. Such UL transmission may refer to a small data transmission, which may be performed through an RA procedure and/or a CG(s) provided by the BS. As described herein, data received from an LCH associated with an SRB or a DRB may refer to small data. In this sense, small data may include control signaling and/or user data. The term "small data" and the term "data" may be utilized interchangeably in the present disclosure if the data is transmitted by the UE in the RRC_INACTIVE state or the RRC_IDLE state.

In order to allow a UE to transmit data via a CG while the UE is not in the RRC_CONNECTED state (e.g., in the RRC_INACTIVE or RRC_IDLE), several UE behaviors are proposed. Based on the UE behaviors, (small) data may be carried by one or multiple TBs to be transmitted on a PUSCH resource(s) derived from a CG configuration provided (configured) by the gNB. It is noted that although the data transmission performed in the RRC_INACTIVE state or the RRC_IDLE state may refer to a small data transmission, the various UE behaviors in the present disclosure can also be applied to UL transmissions for any size of data. For example, the size of data to be transmitted in the RRC_INACTIVE state or the RRC_IDLE state may depend on the size of a PUSCH resource derived from a CG. Furthermore, in the present disclosure, the UE behaviors applicable to the RRC_INACTIVE state may also be applicable to the RRC_IDLE state.

RRC Suspension and CG Configuration

Figure 5:
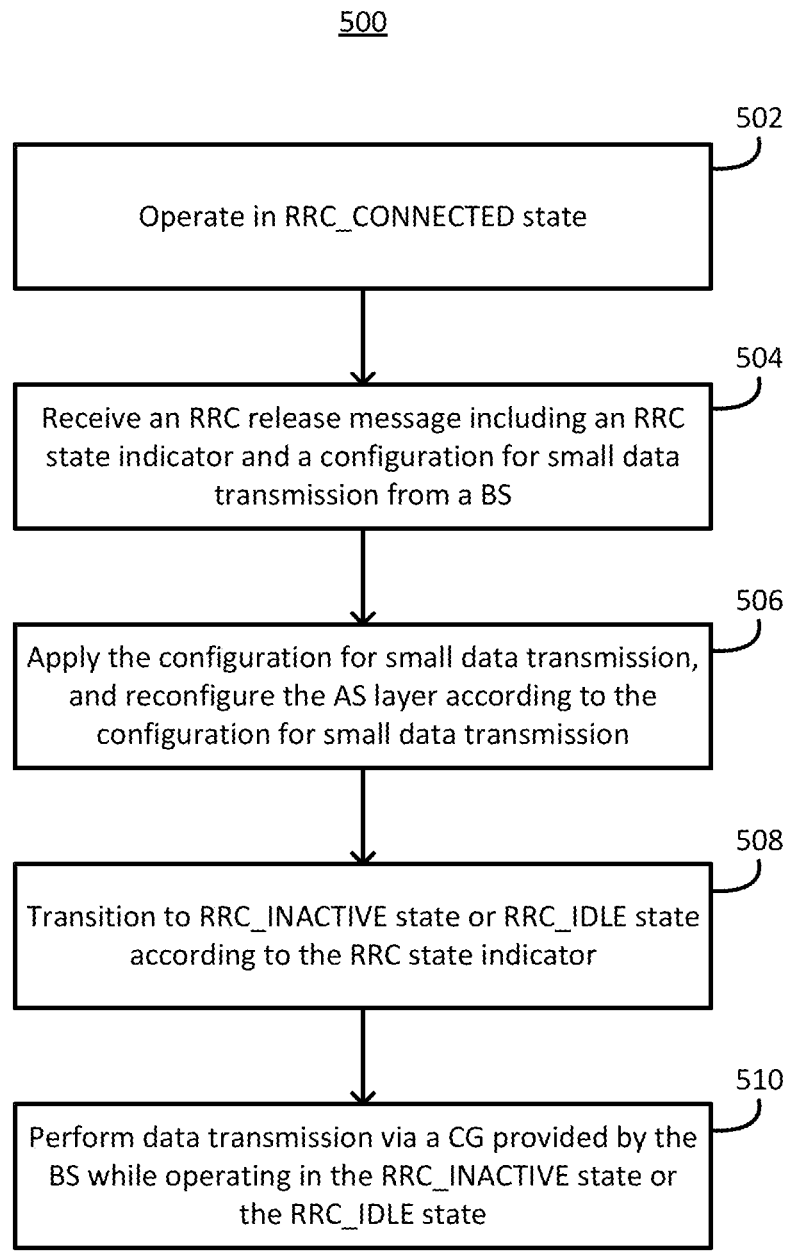
FIG. 5 illustrates a method for a UE that performs small data transmission in an RRC_INACTIVE state or an RRC_IDLE state according to an implementation of the present disclosure.

FIG. 5 illustrates a method 500 for a UE that performs small data transmission in an RRC_INACTIVE state or an RRC_IDLE state according to an implementation of the present disclosure. In action 502, a UE operates in an RRC_CONNECTED state. ABS (e.g., gNB) located in an RAN of NR may indicate to the UE to transition from the RRC_CONNECTED state to an RRC_INACTIVE state or an RRC_IDLE state by transmitting an RRC release message (or "RRCRelease," which can be utilized interchangeably in the present disclosure). For example, if the UE receives the RRC release message when operating in the RRC_CONNECTED state, the UE may perform an RRC connection release procedure to transition from the RRC_CONNECTED state to the RRC_INACTIVE state or the RRC_IDLE state. As used herein, an RRC_CONNECTED UE may refer to a UE that operates in the RRC_CONNECTED state; an RRC_INACTIVE UE may refer to a UE that operates in the RRC_INACTIVE state; an RRC_IDLE UE may refer to a UE that operates in an RRC_IDLE state.

In action 504, the UE may receive an RRC release message including an RRC indicator and a configuration for small data transmission from the BS. The RRC indicator may be, or correspond to, an IE denoted as State Indicator. The RRC indicator may indicate which of the RRC_INACTIVE state and the RRC_IDLE state to which the UE should transition/switch. The RRC indicator may also be implemented as an implicit indication. For example, the BS may indicate to the UE to transition to the RRC_INACTIVE state by including a specific configuration in the RRC release message, and indicate to the UE to transition to the RRC_IDLE state by not including the specific configuration in the RRC release message. In this way, the UE may know which RRC state (e.g., the RRC_INACTIVE state or the RRC_IDLE state) to which it should switch/transition according to the presence of the specific configuration in the RRC release message. The specific configuration may be a suspend configuration (or "SuspendConfig," which can be utilized interchangeably in the present disclosure) that contains the information needed by the UE to maintain its AS context during the RRC_INACTIVE state. The configuration for small data transmission (or "SD_Config," which can be utilized interchangeably in the present disclosure) may contain the information needed by the UE to perform (small) data transmission in the RRC_INACTIVE state or the RRC_IDLE state.

In action 506, the UE may apply the configuration for small data transmission, and reconfigure its AS layer (e.g., the MAC, RLC, PDCP and/or SDAP layer(s)) according to the configuration for small data transmission. In action 508, the UE may transition to the RRC_INACTIVE state or the RRC_IDLE state according to the RRC state indicator. In action 510, the UE may perform data transmission (e.g., small data transmission), according to the configuration for small data transmission via a CG provided by the BS while operating in the RRC_INACTIVE state or the RRC_IDLE state.

Based on whether the configuration for small data transmission (SD_Config) is included in the suspend configuration (SuspendConfig), the UE may determine to which RRC state it should transition and perform the data transmission. For example, the UE may enter the RRC_INACTIVE state and perform data transmission via a CG or an RA procedure while operating in the RRC_INACTIVE state if the UE determines that the SD_Config is included in the SuspendConfig. Otherwise, the UE may enter the RRC_IDLE state and perform data transmission via a CG or an RA procedure while operating in the RRC_IDLE state if the UE determines that the SD_Config is not included in the SuspendConfig but is included in the RRCRelease.

As described previously, the SD_Config may contain the information needed by the UE to perform (small) data transmission in the RRC_INACTIVE state or the RRC_IDLE state. For example, the SD_Config may include one or more of the indicators (e.g., the first to tenth indicators)/configurations described in the following sections (A) to (L).

(A) While the UE is operating in the RRC_CONNECTED state, the UE may be configured by the gNB with at least one UL BWP during the RRC release procedure. Additionally, in NR, the CG resource may be configured on multiple UL BWPs. In order to balance the system load balancing among the UL BWP(s), it may be beneficial to allow the BS (e.g., gNB) to restrict a UE to perform an UL data transmission (e.g., small data transmission) via a CG in the RRC_INACTIVE state or the RRC_IDLE state on a specific UL BWP(s). The BS may indicate to the UE that a small data transmission via a CG (in the RRC_INACTIVE state and/or the RRC_IDLE state) can only be performed on a specific UL BWP(s). For example, the SD_Config may contain a first indicator that indicates one or more UL BWPs on which small data transmission is allowed to be performed via a set of CG resources configured by a CG. As used herein, the small data transmission performed via a set of CG resources derived from a CG may be referred to as "small data transmission via a CG" for simplicity. Upon receiving the SD_Config, the UE may know that the small data transmission via a CG can be performed on the UL BWP(s) indicated by the first indicator contained in the SD_Config when operating in the RRC_INACTIVE state or the RRC_IDLE state. The UL BWP(s) indicated by the first indicator may be considered as UL BWP(s) configured for small transmission via a CG. Examples related to the first indicator contained in the SD_Config are provided in the following items 1) to 9). Each item may be implemented independent of, or in combination with, other items listed in the section.

1) The UL BWP(s) indicated by the first indicator for small transmission via a CG may be the same as the UL BWP(s) configured (by the BS) for data transmissions performed in the RRC_CONNECTED state.

2) The first indicator may be explicitly represented by a BWP ID(s). For example, the UE may be configured with four BWPs by a BS while operating in the RRC_CONNECTED state. Each of the four BWPs may be associated with a BWP ID (e.g., 1, 2, 3 or 4). Each BWP ID may be considered as (or as a portion of) the first indicator.

3) The first indicator may be implicitly represented by at least one of the following BWP-related IEs provided in 3GPP TS 38.331 and TS 38.321:
  initialUplinkBWP;
  firstActiveUplinkBWP-Id; and
  a specific BWP index.

The BS may implicitly indicate one or more UL BWPs configured for small data transmission via a CG to the UE via the BWP-related IE(s). For example, an UL BWP configured for small data transmission via a CG may be the BWP indicated by the IE initialUplinkBWP.

4) The UL BWP(s) configured for small transmission via a CG may be the BWP(s) that has the smallest or largest BWP ID among all BWPs configured in the RRC_CONNECTED state.

5) The UL BWP(s) configured for small transmission via a CG may be the BWP(s) configured with a CG configuration dedicated for the small data transmission. The CG resource configured by the CG configuration may be a dedicated resource for a UE or may be shared with multiple UEs. The CG resource may be a PUSCH resource.

6) The first indicator may be implicitly represented by one or more CG-related IEs (e.g., configuredGrantConfig) as provided in the 3GPP TS 38.331 and TS 38.321. For example, the first indicator may be contained in the configuredGrantConfig and indicate to the UE to maintain the CG configuration (corresponding to configuredGrantConfig) after transiting to the RRC_INACTIVE state. In this way, the BS may implicitly configure the UE with one or more UL BWPs for small data transmission via a CG by using the CG-related IE(s).

7) The UL BWP(s) configured for small transmission via a CG may be the BWP(s) having the same ID as a specific DL BWP. The specific DL BWP may be applied by the UE to receive the acknowledgement transmitted by the BS in response to the small data. The specific DL BWP may be applied by the UE for monitoring a PDCCH for scheduling DCI that may include at least one of the following commands:
  TA command,
  DL/UL BWP switching command (e.g., a specific BWP index), and
  CG switching command (e.g., a command requesting the UE for switching the CG configuration for small data transmission);

8) The UL BWP(s) configured for small transmission via a CG may be a DL BWP(s) configured with a specific set of DL RSs. Each DL RS may be an SSB or a CSI-RS.

9) The first indicator may be a specific UE ID. The specific UE ID may refer to an RNTI (e.g., I-RNTI, fullI-RNTI, shortI-RNTI, or a specific RNTI), a UE AS context ID, or UE inactive AS context.

(B) The SD_Config may include a second indicator that indicates a list of priorities of multiple BWPs. With the second indicator, the UE may determine the priority order of multiple BWPs. The multiple BWPs may be (or may not be) the UL BWPs configured for small transmission via a CG as described in section (a). For example, if the UE is configured with three BWPs (e.g., $BWP_1$, $BWP_2$ and $BWP_3$) for small data transmission via a CG, the BS may provide a list of priorities of these three BWPs to the UE, allowing the UE to determine the priority order of these three BWPs. According to the priority order, the BWP with the highest priority may be prioritized to be selected for performing small data transmission via a CG.

Examples related to the second indicator and the BWPs with respective priorities are provided in the following items 1) to 3). Each item may be implemented independent of, or in combination with, other items listed in the section.

1) The BWPs may (or may not) be the BWPs indicated by the BS through the first indicator described previously.

2) The UE may sequentially perform small data transmission via a CG on at least one of the BWPs according to the list of priorities indicated by the second indicator.

3) The UE may switch from one BWP to another BWP to perform small data transmission via a CG when at least one of the following events (i) to (iv) occurs:
  (i) The second indicator is received from the BS and contained in:
    a DCI field;
    DCI with CRC bits scrambled by a (pre-configured/pre-defined) RNTI (e.g., CS-RNTI) or a UE ID;
    a DL MAC PDU;
    a MAC subPDU;
    a (sub)header of a MAC subPDU; or
    a DL MAC CE.
  (ii) The second indicator is received from the BS in response to a small data transmission via a CG.
  (iii) The second indicator is received from the BS through broadcast signaling (e.g., a MIB or a SIB).
  (iv) The second indicator is received from the BS via a paging message and/or a short message. The UE may check whether the UE ID included in the parameter PagingRecord in the paging message matches the stored UE ID and/or the stored fullI-RNTI. If the UE ID included in the parameter PagingRecord in the paging message matches the stored UE ID and/or the stored fullI-RNTI, the UE may switch from one BWP to another BWP to perform small data transmission via a CG according to the list of priorities.

(C) The SD_Config may include a third indicator indicating the number of PUSCH repetitions that the UE should perform for small data transmission via a CG. For example, when performing small data transmission, the UE may repeat the transmission of a TB corresponding to small data on a PUSCH (e.g., a CG resource) for a specific number of times indicated by the third indicator.

(D) The SD_Config may include a fourth indicator that indicates a PUSCH configuration for small data transmission. The PUSCH configuration may include at least one of the following parameters:
  mcs-Table: this parameter may indicate an MCS table that the UE should apply to the PUSCH transmission without transforming the precoding scheme; and
  pusch-TimeDomainAllocationList: this parameter represents a list of time-domain allocations for the UL assignment to UL data.

(E) The SD_Config may include a fifth indicator indicating a CG configuration included in a list of pre-configured CG configurations. When the UE operates in the RRC_CONNECTED state, the UE may be preconfigured with multiple CG configurations. The fifth indicator may indicate one or more of the preconfigured CG configurations.

The CG configuration indicated by the fifth indicator may be applied by the UE for small data transmission.

For example, the CG configuration may indicate/determine a physical resource(s) which may be applied by the UE for small data transmission.

The list of preconfigured CG configurations may be transmitted by the BS via a DL RRC message while the UE is operating in the RRC_CONNECTED state. For example, the BS may provide three CG configurations (e.g., CG configuration #1, CG configuration #2 and CG configuration #3), and the fifth indicator may indicate one of the three CG configurations.

Each CG configuration in the list of preconfigured CG configurations may be associated with a set of PUSCH resources (e.g., or "CG resources") on a respective UL BWP configured by the BS. For example, assuming that the UE is configured with UL BWP #1 and UL BWP #2, CG configuration #1 in the list of preconfigured CG configurations may be associated with a set of PUSCH resources on UL BWP #1, and CG configuration #2 in the list of preconfigured CG configurations may be associated with a set of PUSCH resources on UL BWP #2.

Each CG configuration in the list of preconfigured CG configurations may be associated with a set of PUSCH/CG resources on a respective (serving) cell configured by the BS. For example, assuming that the UE is configured with cell #1 and cell #2, CG configuration #1 in the list of preconfigured CG configurations may be associated with a set of PUSCH resources on UL cell #1, and CG configuration #2 in the list of preconfigured CG configurations may be associated with a set of PUSCH resources on cell #2.

(F) The SD_Config may include a sixth indicator indicating a maximum size of a TB/data can be transmission on a BWP and/or cell via a CG;

(G) The SD_Config may include a seventh indicator/configuration indicating one or more radio bearers (e.g., SRB(s) and/or DRB(s)) that the UE should maintain (or not release) when the UE performs the RRC (connection) release procedure. According to the seventh indicator, the indicated radio bearers may be maintained by the UE even if the UE transitions to the RRC_INACTIVE state or the RRC_IDLE state. The LCH associated with the indicated radio bearer may be selected by the MAC entity of the UE for a multiplexing and assembly procedure for small data transmission.

(H) The SD_Config may include a configuration of an LCP restriction (e.g., smalldata allowance) for at least one LCH configured for the RRC_CONNECTED state. The LCP restriction may be configured by the BS per an LCH basis via the SD_Config. For example, when the UE operates in the RRC_INACTIVE state and is performing an M&A procedure for preparing/generating a MAC PDU for small data transmission via a CG, the MAC entity of the UE may only select the LCH that is configured with the smalldata allowance to join the M&A and LCP procedure.

(I) The SD_Config may include a set of configurations providing information needed by the UE to perform a MAC procedure/process for completing small data transmission via a CG. The MAC procedure/process may include at least one of the following:
  an LCP procedure;
  an UL shared channel data transfer procedure;
  a Hybrid Automatic Repeat Request (HARD) process of the UL shared channel data transfer procedure; and
  a B SR procedure.

(J) The SD_Config may include an eighth indicator indicating an access category (e.g., service type of data) and/or an access identity permitted for small data transmission via a CG. The eighth indicator may also indicate a set of permitted access categories or a specific value. If the ID of an access category is smaller than the specific value, the access category is considered permitted.

The SD_Config may include one or multiple CG configurations. After receiving the CG configuration(s), the UE may send an UL indicator to the BS, where the UL indicator may be a UE ID that may refer to an RNTI (e.g., I-RNTI, fullI-RNTI, shortI-RNTI, or other specific RNTI), a UE AS context ID, and/or UE inactive AS context. The UE ID may be transmitted together with the small data transmission. For example, the UE ID may be transmitted via an MSG1, MSG3, MSGA, and/or an UL resource derived from a CG. The UE ID may be used by the UE for requesting the BS (e.g., gNB) to allow the UE to perform small data transmission (e.g., via the CG). For example, the UE ID may be used to scramble with CRC bits of the DCI, where the DCI is used as an acknowledgement in response to a small data transmission. In a case of multiple UEs sharing the same resource(s) for small data transmission, the BS may identify small data transmissions from different UEs according to the corresponding UE IDs of the UEs.

As described previously, the BS may provide the SD_Config to the UE via an RRC release message. The UE may perform a small-data-specific RRC connection release procedure in response to the RRC release message, as illustrated in FIG. 6.

Figure 6:
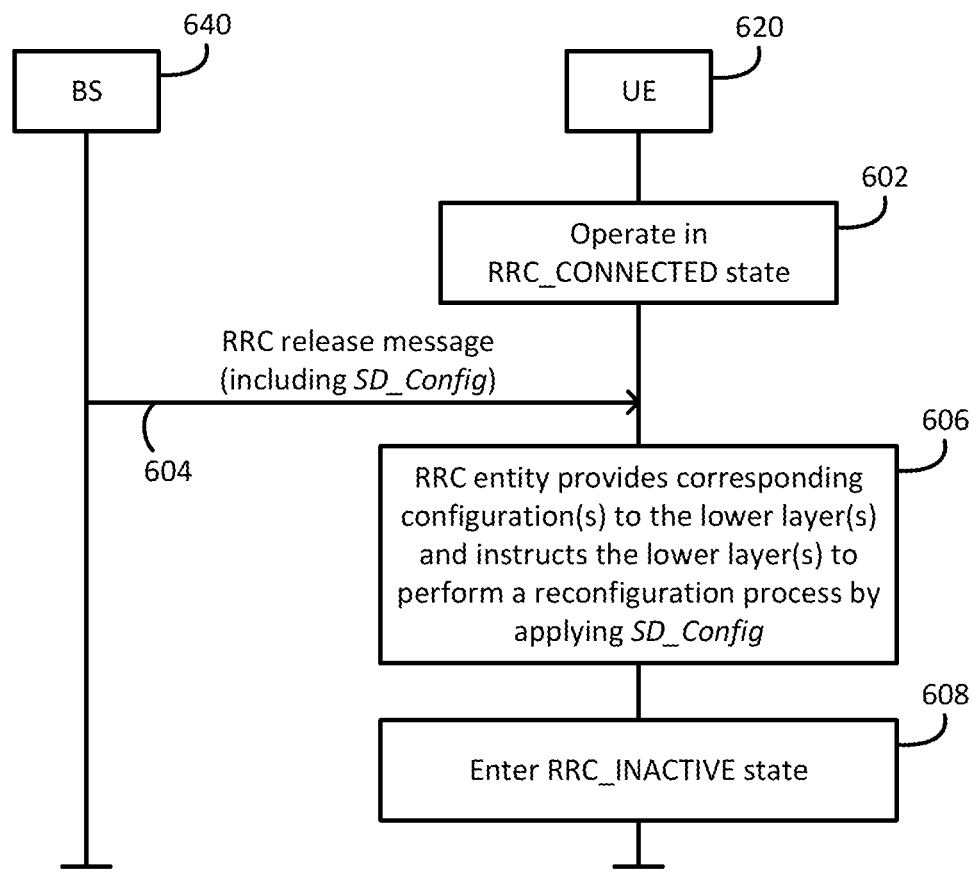
FIG. 6 illustrates a small-data-specific RRC connection release procedure according to an implementation of the present disclosure.

FIG. 6 illustrates a small-data-specific RRC connection release procedure according to an implementation of the present disclosure. In action 602, the UE 620 operates in the RRC_CONNECTED state. In action 604, the UE 620 receives an RRC release message from the BS 640 while operating in the RRC_CONNECTED state. The RRC release message may include an RRC configuration (e.g., SD_Config) that provides information needed by the UE to perform small data transmission via a CG in the RRC_INACTIVE state. Once the RRC layer of the UE 620 successfully receives the RRC release message, in action 606, the RRC layer may provide corresponding configuration(s) to the lower layer(s) (e.g., the PHY, MAC, RLC, PDCP and/or SDAP layer(s)), and instruct the lower layer(s)

to perform a reconfiguration process by applying the RRC configuration (e.g., SD_Config). After that, the UE 620 leaves the RRC_CONNECTED state and enters the RRC_INACTIVE state in action 608.

(K) The SD_Config in the RRC release message may include at least one of the following indicators/configurations 1) to 4):

1) A nineth indicator indicating one or multiple radio bearers to be applied to small data transmission via a CG. For example, the indicator may be:
   - a parameter that indicates a corresponding radio bearer ID; or
   - a bitmap, where each bit of the bitmap may be associated with a radio bearer configured in the RRC_CONNECTED state. For example, a bit in the bitmap may be set to '1' to indicate that the radio bearer corresponding to this bit should be applied to small data transmission via a CG, and set to '0' to indicate that the radio bearer corresponding to this bit should not be applied for small data transmission via a CG. For example, ith bit of the bitmap may be associated with a radio bearer which with an ith largest/smallest ID among all configured radio bearer or all configured data radio bearer.

2) A tenth indicator (e.g., a HARQ ID) that indicates one or more HARQ processes to be applied by the MAC and/or PHY layer of the UE for small data transmission via a CG.

3) A small-data-specific LCH configuration (e.g., LogicalChannelConfig) including one or more parameters needed by the MAC entity of the UE for an LCH associated with an indicated radio bearer. The parameter(s) included in the LogicalChannelConfig may include at least one of the following parameters illustrated in Table 1.

TABLE 1

| LogicalChannelConfig field descriptions |
|---|
| allowedSCS-List |
| If present, UL MAC SDUs from this logical channel can only be mapped to the indicated numerology. Otherwise, UL MAC SDUs from this logical channel can be mapped to any configured numerology. Only the values 15/30/60 kHz (for FR1) and 60/120 kHz (for FR2) are applicable. Corresponds to 'allowedSCS-List' as specified in TS 38.321. |
| allowedServingCells |
| If present, UL MAC SDUs from this logical channel can only be mapped to the serving cells indicated in this list. Otherwise, UL MAC SDUs from this logical channel can be mapped to any configured serving cell of this cell group. Corresponds to 'allowedServingCells' in TS 38.321. |
| bucketSizeDuration |
| Value in ms. ms5 corresponds to 5 ms, value ms10 corresponds to 10 ms, and so on. |
| logicalChannelGroup |
| ID of the logical channel group, as specified in TS 38.321, which the logical channel belongs to. |
| logicalChannelSR-Mask |
| Controls SR triggering when a configured UL grant of type 1 or type 2 is configured. true indicates that SR masking is configured for this logical channel as specified in TS 38.321. |
| logicalChannelSR-DelayTimerApplied |
| Indicates whether to apply the delay timer for SR transmission for this logical channel. Set to false if logicalChannelSR-DelayTimer is not included in BSR-Config. |

TABLE 1-continued

| LogicalChannelConfig field descriptions |
|---|
| maxPUSCH-Duration |
| If present, UL MAC SDUs from this logical channel can only be transmitted using UL grants that result in a PUSCH duration shorter than or equal to the duration indicated by this field. Otherwise, UL MAC SDUs from this logical channel can be transmitted using an UL grant resulting in any PUSCH duration. Corresponds to "maxPUSCH-Duration" in TS 38.321. |
| priority |
| Logical channel priority, as specified in TS 38.321. |
| prioritisedBitRate |
| Value in kiloBytes/s. Value kBps0 corresponds to 0 kiloBytes/s, value kBps8 corresponds to 8 kiloBytes/s, value kBps16 corresponds to 16 kiloBytes/s, and so on. For SRBs, the value can only be set to infinity. |
| schedulingRequestId |
| If present, it indicates the scheduling request configuration applicable for this logical channel, as specified in TS 38.321. |

An LCH may be configured by different LCH configurations for different RRC states. For example, an LCH may be configured by a first LCH configuration for the RRC_CONNECTED state and configured by a second LCH configuration for the RRC_INACITVE state. The MAC entity may release at least a portion of the first LCH configuration and apply the second LCH configuration when performing small data transmission via a CG in the RRC_INACTIVE state.

An LCH may be associated with a first radio bearer indicated by the B S. The first radio bearer may be applied by the UE for performing small data transmission via a CG. Before receiving an RRC release message including the SD_Config, the MAC entity of the UE may apply a first set of LCP-related parameters (e.g., priority, prioritisedBitRate and/or bucketSizeDuration) and/or LCP-restriction-related parameters (e.g., allowedSCS-List, allow edServingCell, allowedCG-List, allow edPHY-PriorityIndex and/or maxPUSCH-Duration) when the UE operates in the RRC_CONNECTED state. The allowedCG-List may be used to set the allowed CG(s) for transmission for the configured LCH. The allowedPHY-PriorityIndex may be used to set the allowed PHY priority index(es) of a CG for transmission. The MAC entity of the UE may apply a second set of LCP-related parameters and/or LCP-restriction-related parameters when performing small data transmission via a CG in the RRC_INACTIVE state. The second set of LCP-related parameters and/or LCP-restriction-related parameters may, but not limited to, be included in the SD_Config.

4) A specific MAC cell group configuration including one or more parameters (as provided in the 3GPP TS 38.331). Example values for each parameter are illustrated in Table 2. The values illustrated in Table 2 are for illustrative purposes only.

TABLE 2

| Parameter | Value (example) |
|---|---|
| MAC Cell Group configuration | |
| bsr-Config | |
| >periodicBSR-Timer | sf10 |
| >retxBSR-Timer | sf80 |

TABLE 2-continued

| Parameter | Value (example) |
|---|---|
| phr-Config | |
| >phr-Periodic Timer | sf10 |
| >phr-ProhibitTimer | sf10 |
| >phr-Tx-PowerFactorChange | dB1 |

The MAC entity of the UE may be allowed/indicated/configured by the BS to perform small data transmission via a CG. Before receiving the RRC release message including the SD_Config, the MAC entity of the UE may apply a first MAC cell group configuration for BSR-related parameters (e.g., periodicBSR-Timer and/or retxBSR-Timer) and/or PHR-related parameters (e.g., phr-PeriodicTimer, phr-ProhibitTimer and/or phr-Tx-PowerFactorChange) when the UE operates in the RRC_CONNECTED state. The MAC entity of the UE may apply a second MAC cell group configuration for B SR-related parameters and/or PHR-related parameters when the UE operates in the RRC_CONNECTED state when performing small data transmission via a CG in the RRC_INACTIVE state. The second MAC cell group configuration for B SR-related parameters and/or PHR-related parameters may, but not limited to, be included in the SD_Config.

The BS may configure the UE with multiple sets of parameters illustrated in Table 2 and the corresponding values. One of the multiple sets of parameters may be applied by the UE for performing small data transmission via a CG while the UE is operating in the RRC_INACTIVE state.

Configurations of one or more parameters corresponding to a BSR/PHR/LCP procedure and/or LCP-restriction-related parameters which are configured for the RRC_CONNECTED state may be maintained by the UE after transitioning to the RRC_INACTIVE state.

The configurations and/or indicators (e.g., the first to tenth indicators) described previously may be preconfigured by the BS via an RRC reconfiguration message or before the BS initiates the RRC release procedure.

The configuration and/or the indicator mentioned above may also be preconfigured by the gNB, via a suspendConfig IE (as introduced and defined in the 3GPP TS 38.331) which included in the RRCRelease message.

(L) As described previously, the RRC layer of the UE may reconfigure the lower layer(s) after the BS initiates an RRC (connection) release procedure and transmits an RRC release message to the UE. If the RRC release message includes SD_Config, the RRC layer of the UE may reconfigure the lower layer(s) according to the SD_Config.

Figure 7:
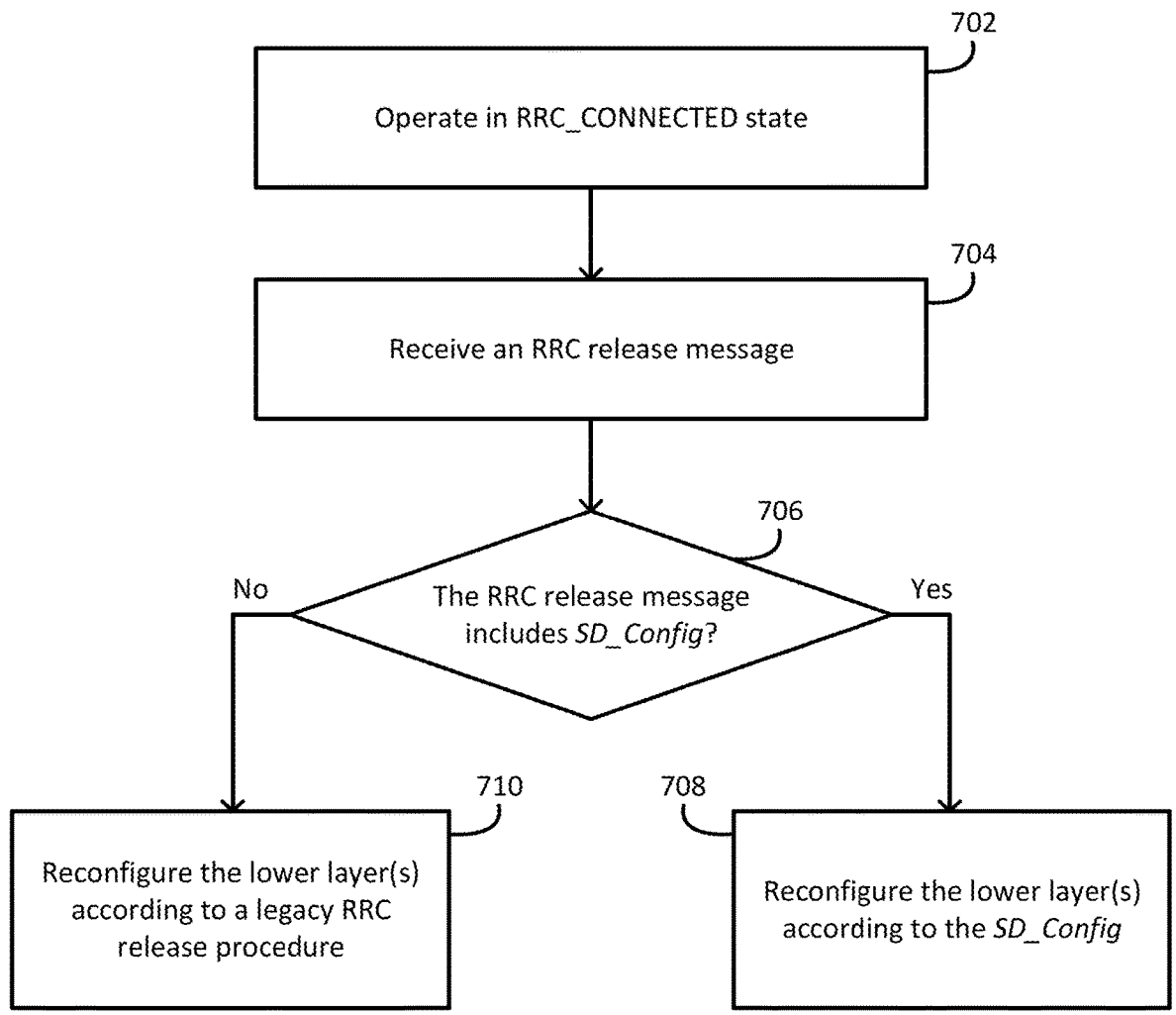
FIG. 7 illustrates an RRC release procedure according to an implementation of the present disclosure.

FIG. 7 illustrates an RRC (connection) release procedure 700 according to an implementation of the present disclosure. In action 702, the UE may operate in the RRC_CONNECTED state. In action 704, while operating in the RRC_CONNECTED state, the UE may receive an RRC release message from the BS. In action 706, the UE may determine whether the RRC release message includes the SD_Config. 1f the RRC release message includes the SD_Config, the RRC layer of the UE may reconfigure lower layer(s) according to the SD_Config in action 708. If the RRC release message does not include the SD_Config, the UE may reconfigure the lower layer(s) according to a legacy RRC release procedure defined in NR Release Rel.15 in action 710. For example, if the UE transitions from the RRC_CONNECTED state to the RRC_INACTIVE state by performing the legacy RRC release procedure, the UE in the RRC_INACTIVE state may be only granted to perform RRC signaling transmission via random access and is not allowed to perform small data transmission. Compared to the RRC signaling transmission via random access, the small data transmission may be an UL transmission for data received from an LCH associated with an SRB or a DRB. Therefore, the small data transmission may include transmission of user data (or data from the user plane) if the small data received from an LCH associated with a DRB.

The reconfiguration to the lower layer(s) in action 708 may include at least one of the following UE behaviors 1) to 15):

1) Apply the received SD_Config.
2) Keep at least a portion or all of the MAC configuration (i.e., not all of the MAC configuration is reset/released). For example, the UE may partially reset the MAC entity by not stopping the CG-related timers, BWP-related timers, and/or TA timers.
3) Keep the default MAC Cell Group configuration.
4) Release the default MAC Cell Group configuration.
5) Apply a specific MAC cell group configuration described previously.
6) Re-establish the RLC entities of the UE for a radio bearer(s) indicated by the BS (via the SD_Config).
7) (Re)configure the RLC entities of the UE for a radio bearer(s) indicated by the BS (via the SD_Config).
8) Suspend all SRB(s) and DRB(s), except for SRB0 and the radio bearer(s) indicated by the BS for small data transmission via a CG.
9) Suspend all SRB(s) and DRB(s), except for SRB0 and the radio bearer(s) indicated by the BS (via the SD_Config).
10) Instruct the PDCP layer to suspend the lower layer(s) for all DRBs, except for the radio bearer(s) indicated by the BS for small data transmission via a CG.
11) Instruct the PDCP layer to suspend the lower layer(s) for all DRBs, except for the radio bearer(s) indicated by the BS (via the SD_Config).
12) Indicate to the lower layer(s) (e.g., the MAC layer and/or PHY layer) HARQ process(es) indicated by the BS (via the SD_Config) for small data transmission via a CG;
13) If the RRC release message including the SD_Config is neither received in response to RRCResumeRequest nor received in response to RRCResumeRequest1, store, in the UE Inactive AS Context, the configured suspendConfig, the current $K_{gNB}$ and $K_{RRCint}$ keys, the ROHC state, the C-RNTI used in the source PCell, the cellIdentay and the physical cell identity of the source PCell, and other parameters configured except with ReconfigurationWahSync.
14) Inform the upper layer that access-barring is applicable for the access category indicated by the BS (via the SDConfig).
15) Indicate to the upper layer (e.g., RRC layer) that the reconfiguration corresponding to the SD_Config is completed. The RRC layer of the UE may receive, from the lower layers, an indication that the reconfiguration corresponding to the SD_Config is completed.

Action 706 may be replaced by one or more of the following actions (i) to (iii):
(i) The UE determines whether the RRC release message includes a suspendConfig (an IE applied by the BS for indicating a configuration for the RRC_INACTIVE state as defined in the 3GPP TS 38.331). The suspendConfig may include the SD_Config.

(ii) The UE determines whether the suspendConfig IE includes the SD_Config IE. If the determination result is Yes, the procedure goes to action 708; otherwise, the procedure goes to action 710.

(iii) The RRCRelease message includes a suspendConfig and the suspendConfig IE includes the SD_Config IE. If the determination result is Yes, the procedure goes to action 708; otherwise, the procedure goes to action 710.

A proposal for the RRC (connection) release procedure 700 is illustrated in Table 3.

TABLE 3

The UE shall:
1> if the RRCRelease includes suspendConfig:
   2> if the suspendConfig includes SD_Config:
      3> apply the received SD_Config;
      3> apply the specific MAC Cell Group configuration, if any;
      3> (Re)Configure RLC entities for the radio bearer which indicated by the SD_Config;
      3> Suspend all SRB(s) and DRB(s), except SRB0 and the radio bearer(s) indicated by the gNB (via the SD_Config);
      3> indicate PDCP suspend to lower layers of all DRBs except the radio bearer(s) indicated by the gNB (via the SD_Config);
      3> indicates lower layer (i.e., MAC and/or PHY) the HARQ process(es) indicated by the gNB (via the SD_Config);

UL Time Alignment (TA) Validation Check

In NR, if a UE does not have a valid TA value for a serving cell (e.g., the time alignment timer (timeAlignmentTimer) associated with the serving cell is not running), the UE may not perform any UL transmission on the serving cell except the transmission that corresponds to an RA procedure. In the RRC_CONNECTED state, the BS may maintain the TA value(s). The serving cell(s) with the same UL TA value and same timing reference cell may be grouped as a TAG. Each TAG may include at least one serving cell with a configured UL. The mapping relationship between a serving cell and a TAG may be configured by RRC.

An RRC_CONNECTED UE may be configured, by the BS via a DL RRC message, with a timeAlignmentTimer for each TAG. The timeAlignmentTimer may (re)start when the UE receives a TA value from the BS. The TA value may be an absolute timing value that the UE should take into consideration when determining the time-domain position of an UL transmission. The TA value may be an offset in time domain that the UE should take into consideration when adjusting the current TA value for UL transmission. For example, an adjusted TA value may be determined by [the current TA value±K×offset], where K is an integer.

A TA value may be considered valid if the timeAlignmentTimer corresponding to the TA value is running. The TA value may be indicated by a TA command included in an RAR message or a DL MAC CE. The DL MAC CE may be carried by a DL MAC subPDU. In the RRC_CONNECTED state, the UE may dynamically or aperiodically receive a TA command for TA maintenance. However, in a legacy system such as LTE, an RRC_INACTIVE UE may not have a valid TA value since all timeAlignmentTimer should be considered expired when an RRC release procedure is preformed (leading to reset of the MAC entity/layer). In order to support small data transmission via a CG in the RRC_INACTIVE state, the method(s) for small data transmission via a CG that take TA maintenance into consideration are provided.

Figure 8:
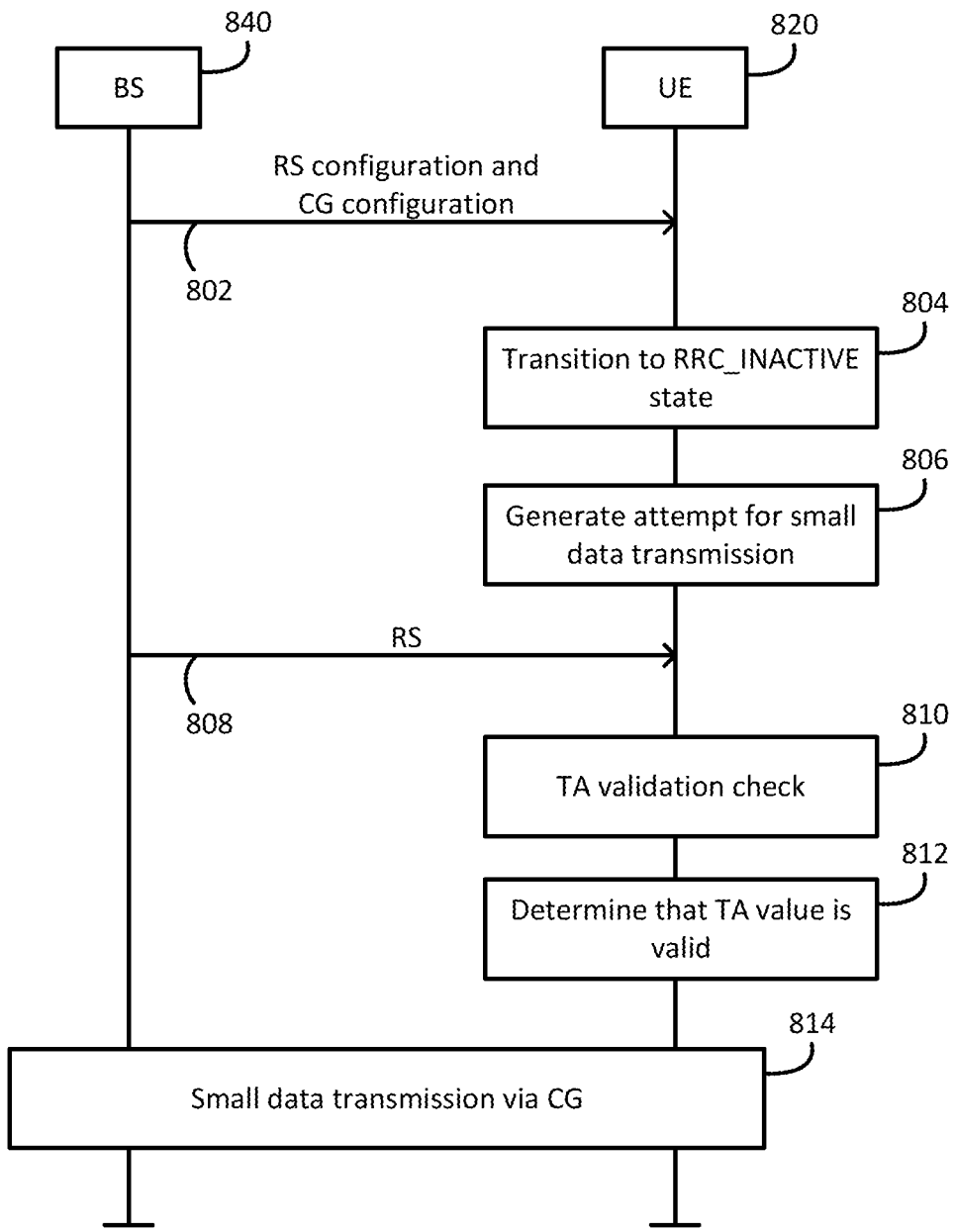
FIG. 8 illustrates a procedure of small data transmission via CG according to an implementation of the present disclosure.

FIG. 8 illustrates a procedure of small data transmission via a CG according to an implementation of the present disclosure. In action 802, the UE 820 (as an RRC_CONNECTED UE) may receive an RS configuration(s) and a CG configuration(s) from the BS 840. In action 804, the UE 820 may transition from the RRC_CONNECTED state to the RRC_INACTIVE state. The RS configuration may include at least one RS ID. The RS ID may refer to a specific type of DL RS transmitted by the BS. The DL RS may be an SSB, a CSI-RS or any other types of RS(s). The RS ID may be an SSI index (SSB-Index) associated with an SSB within an SS burst to be measured and used for reporting. The RS ID may be a CSI-RS resource index (CSI-RS-Index) associated with a CSI-RS resource to be measured (and used for reporting). The SSB-Index and CSI-RS-Index may be specified in TS 38.331, TS 38.321 and TS 38.214. The CG configuration(s) may be dedicated to the UE (or common/shared by a group of UEs) for performing small data transmission via a CG in the RRC_INACTIVE state. The CG configuration may be included in the SD_Config described previously.

In action 806, the UE 820 (as an RRC_INACTIVE UE) may generate an attempt for small data transmission (e.g., when the AS layer of the UE 820 has data ready for transmission). In action 808, the UE 820 may receive RS(s) from the BS 840. In action 810, the UE 820 may perform TA validation check to determine whether there is any valid TA value applicable for small data transmission. The UE 820 may perform small data transmission in the RRC_INACTIVE state only when the UE 820 has a valid TA value. As illustrated in FIG. 8, after that the UE 820 determines that the TA value is valid in action 810, the UE 820 may perform small data transmission via a CG in action 814.

For TA validation check, the UE 820 may measure the RS(s) received in action 808, and determine the validity the corresponding TA value according to the measurement result. The RS(s) to be measured may be preconfigured (or indicated) by the BS 840. The measurement result of the RS(s) may be an RSRP value of the RS(s). The UE 820 may compare the RSRP value of the RS(s) with a preconfigured value (e.g., an offset), a threshold, or the RSRP value of another RS to determine whether a TA value is valid, where the preconfigured value, the threshold, and the RSRP value of another RS may be configured by the BS 840 (or derived by UE the 820 based on a measurement process indicated/triggered by the BS 840) before TA validation check is performed.

Figure 9:
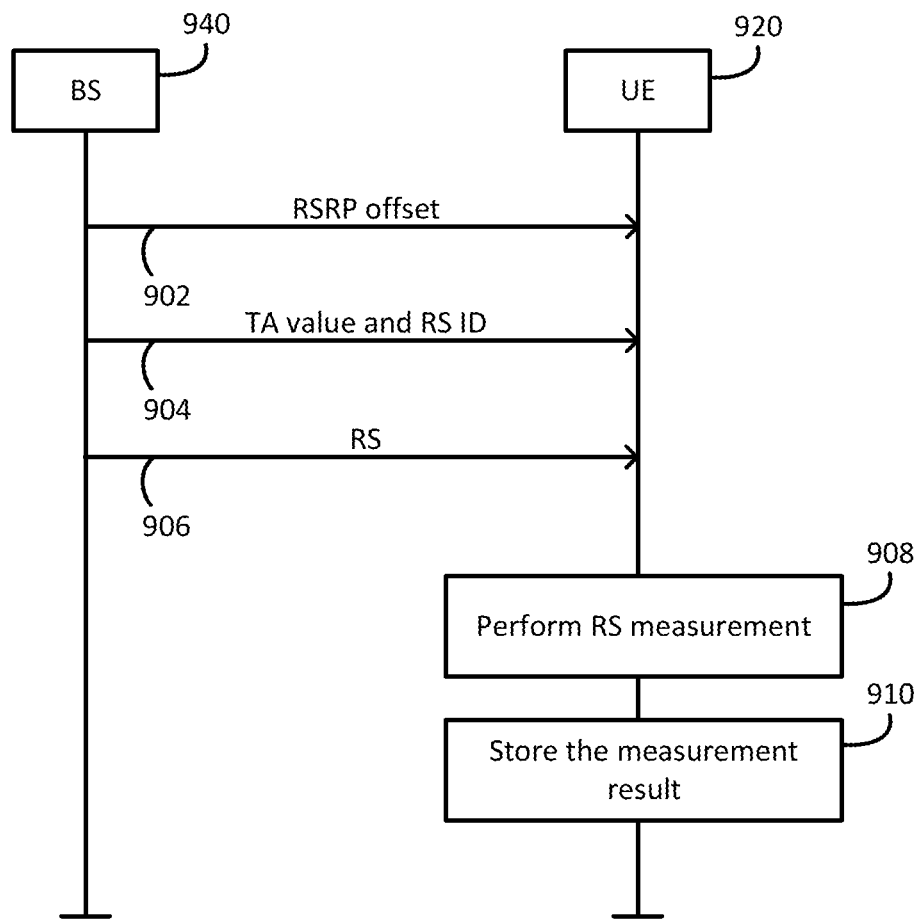
FIG. 9 illustrates a procedure of configuring TA validation check according to an implementation of the present disclosure.

FIG. 9 illustrates a procedure of configuring TA validation check according to an implementation of the present disclosure. Before the UE 920 enters the RRC_INACTIVE state (e.g., the UE 920 is in the RRC_CONNECTED state), the BS 940 may configure the UE 920 with a configuration for TA validation check. The configuration for TA validation check may be transmitted by the BS 940 via broadcast MIB, broadcast SIB(s) and/or unicast (RRC) message(s).

As illustrated in FIG. 9, the UE 920 may receive an RSRP offset from the BS 940 in action 902 and receive a TA value and an RS ID from the BS 940 in action 904. The RSRP offset, the TA value, and/or the RS ID may be considered as a portion of a configuration for TA validation check.

The configuration for TA validation check may be carried by a DL RRC message, a DL MAC PDU, a DL MAC subPDU, a subheader of a MAC subPDU, a DL MAC CE or a field in a DCI format. For example, the UE 920 may receive the RSRP offset via a broadcast MIB and/or a broadcast SIB(s). The RSRP offset may be shared by a group of UEs. For example, the RSRP offset may be shared by all UEs located within a cell/RAN notification area (RNA).

In action 906, after receiving the configuration for TA validation check (and the corresponding reconfiguration is performed), the UE 920 may receive an RS indicated by the RS ID received in action 904. In action 908, the UE 920 may perform RS measurement to measure the RS received in action 906. In action 910, the UE 920 may store/maintain the measurement result of the RS. For example, the UE 920 may consider the RSRP value of the RS as the measurement result, and the UE may store/maintain the RSRP value. The RSRP value may be stored/maintained by the UE 920 in the RRC, MAC or PHY layer.

Actions 908 and 910 may be dynamically triggered by the BS 940. For example, when the UE 920 is in the RRC_INACTIVE state, the UE 920 may re-measure the RS indicated by the RS ID received in action 904 (or other RSs indicated by the BS 940) if a specific condition is satisfied. The specific condition may be that a TA value, a TA command, and/or an indicator that instructs the UE 920 to perform RS re-measurement is newly-received. Once the RS re-measurement is performed, the UE 920 may update the previously-stored measurement result with the newly-obtained measurement result, and perform TA validation check according to the newly-obtained measurement result.

Figure 10:
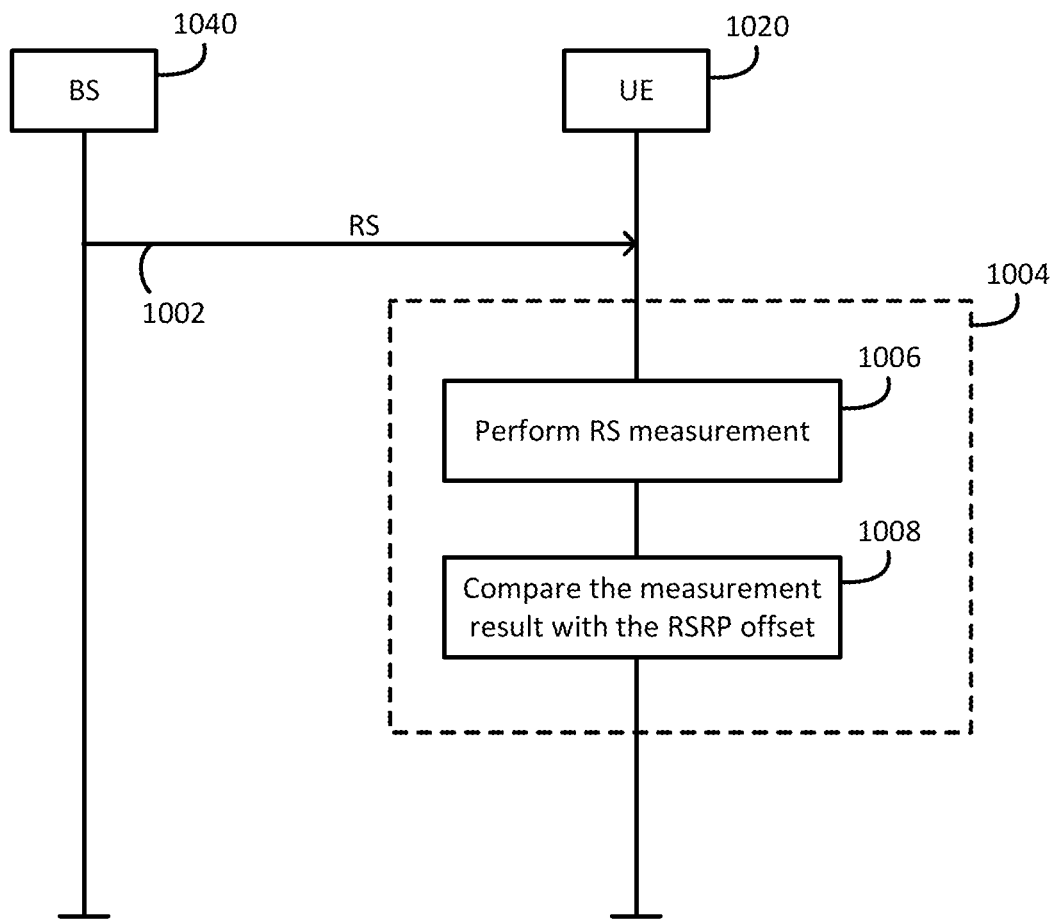
FIG. 10 illustrates a detailed process of TA validation check according to an implementation of the present disclosure.

FIG. 10 illustrates a detailed process of TA validation check according to an implementation of the present disclosure. In action 1002, the UE 1020 may receive an RS from the BS 1040. In action 1004, TA validation check is performed. As illustrated in FIG. 10, actions 1006 and 1008 are performed during the TA validation check.

In action 1006, the UE 1020 may perform RS measurement (e.g., by measuring the RS received in action 1002) and obtain the corresponding measurement result. In action 1008, the UE 1020 may compare the measurement result of the RS with an RSRP offset to determine whether a TA value corresponding to the RS is valid.

A UE may (re)start a timer from an initial value each time the RS measurement is performed. The stored RS measurement result may be released/cleared/flushed by the UE if the timer expires. The timer may be configured by the BS per a serving cell/BWP basis. The unit of the timer may be (a fraction of) symbol, slot subframe, system frame, SFN, milliseconds (ms), or the time period of a PUSCH resource derived from a CG configuration. The UE may release the store measurement result is at least one of the following events (i) to (vi) occurs.

(i) An RA procedure is initiated.
(ii) The CG configuration for small data transmission is released or suspended.
(iii) The UE is out of the coverage area of a serving cell, where the stored measurement result is obtained by performing RS measurement on the serving cell.
(iv) The TA value is considered invalid.
(v) The UE enter the RRC_IDLE state or the RRC_CONNECTED state.
(vi) The UE performs an RNA update procedure.

As described previously, once TA validation check is triggered and/or needed to be performed by the UE, the UE may perform RS measurement. During the RS measurement, the UE may measure (the RSRP value of) a specific RS. The specific RS may be a DL RS indicated by the BS and/or associated with a CG configuration. The UE may compare the RSRP value of the specific RS with the an RSRP offset. Alternatively or additionally, the UE may calculate a difference between a first RSRP value of the specific RS and a second RSRP value of the specific RS. The first RSRP value and the second RSRP value may be obtained by measuring the specific RS at different time points. In other words, the second RSRP value may be considered as a previously-stored measurement result of the specific RS (e.g., the stored measurement result described in action 910 of FIG. 9), and the first RSRP value may be considered as a current measurement result obtained later than the second RSRP value. Therefore, the difference between the first RSRP value and the second RSRP value may be considered as the amount of RSRP change of the specific RS within a time period. The UE may compare the difference with an RSRP offset to determine the validity of a corresponding TA value.

The RSRP offset may be configured by the BS. The RSRP offset may be a CG-configuration-specific offset. For a UE configured with multiple RSRP offsets, the UE may compare the RSRP of the specific RS with the one of the multiple RSRP offsets. The BS may configure the UE with different RSRP offsets for different BWPs. The RSRP offset may be a positive offset or a negative offset. If the difference between the first RSRP value and the second RSRP value is a positive value, the UE may compare the difference with the positive offset. If the difference between the first RSRP value and the second RSRP value is a negative value, the UE may compare the difference with the negative offset.

The UE may determine whether TA validation check is passed according to the following condition A-1:

$$|(\text{first RSRP value}) - (\text{second RSRP value})| \leq (\text{RSRP offset}) \quad (A\text{-}1)$$

The UE may determine that TA validation check is passed (or the corresponding TA value is valid) if the condition A-1 is met and/or at least one of the following restrictions (i) to (iii) is also met:

(i) The condition A-1 is determined met at a specific time point. The specific time point may be in the latest RS occasion where the UE receive the specific RS for RS measurement within a time interval for TA validation ($T_{Validation}$). The specific time point may be in the first RS occasion or the last RS occasion within the time interval $T_{Validation}$. The specific time point may be configured by the BS via a DL RRC message.

(ii) The condition A-1 has been determined met for a period of time. The period of time may be a predefined time period or preconfigured by the BS. The period of time may be configured by the BS via a DL RRC message.

(iii) The condition A-1 is determined met at a time point before a PUSCH resource derived from a CG. In other words, there may be a time offset between the time point that the condition A-1 is determined satisfied and the beginning of the PUSCH resource. The time offset may be configured by the BS via a DL RRC message. As used herein, a PUSCH resource derived from a CG may also be referred to as a PUSCH resource of CG or a CG resource.

Figure 11:
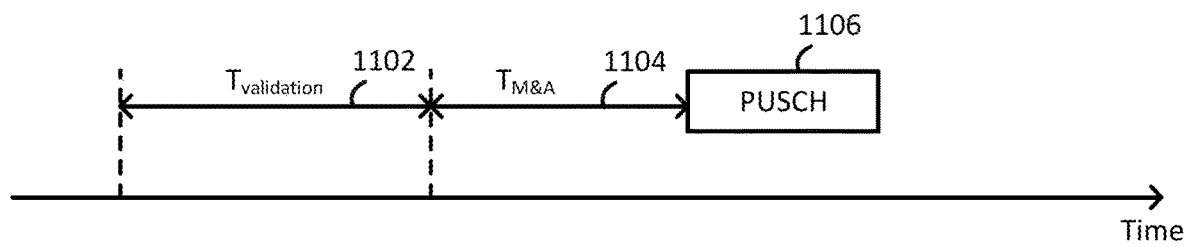
FIG. 11 is a schematic diagram illustrating the relative time positions of the time interval for TA validation and a Physical Uplink Shared Channel (PUSCH) resource according to an implementation of the present disclosure.

FIG. 11 is a schematic diagram illustrating the relative time positions of the time interval for TA validation ($T_{Validation}$) and a PUSCH resource according to an implementation of the present disclosure. As illustrated in FIG. 11, the time position of the $T_{Validation}$ 1102 is before time position of the PUSCH resource 1106. The PUSCH resource 1106 may be a CG resource. Between the $T_{Validation}$ 1102 and the PUSCH resource 1106, there may be a time interval for M&A ($T_{M\&A}$) 1104. The $T_{M\&A}$ 1104 may be considered as a time period reserved for the UE to perform a layer-2 MAC PDU M&A process for small data transmission. The $T_{M\&A}$ 1104 may be preconfigured by the BS via a DL RRC message or other signaling transmitted to the UE in the RRC_CONNECTED state. The UE may determine that TA validation check is passed (or the corresponding TA value is valid) if the condition A-1 described previously is determined met at the beginning of the $T_{M\&A}$ 1104.

The length of the $T_{M\&A}$ 1104 may be different for different UEs, depending on each UE's capability. Therefore, allowing a UE to report its capability related to the supported length/value of $T_{M\&A}$ (or "$T_{M\&A}$-related capability") may be beneficial. The reporting of the $T_{M\&A}$-related capability may be performed by the UE via an UL RRC message while the UE is in the RRC_CONNECTED state. For example, the UE may report multiple supported values of $T_{M\&A}$ to the BS, where one of the supported values of $T_{M\&A}$ is for the case of single CG configuration and another of the supported values of $T_{M\&A}$ is for the case of multiple CG configurations.

In the case of multiple CG configurations (e.g., the UE is configured with multiple CG configurations), the UE may be allowed to perform small data transmission by using one or more of the configured CG configurations. Therefore, the UE may report a specific value of $T_{M\&A}$ to the BS for reference in this case. The unit of the value of $T_{M\&A}$ may be a numerology-dependent unit (e.g., a symbol or a slot) or an absolute time unit (e.g., ms).

A TA-related timer (e.g., TA-valid timer (TVT_Timer)) may be applied in TA validation check. The TA-related timer may define a timer interval during which a TA value is allowed to be considered as valid. The TA-related timer may be maintained by the RRC layer or the MAC layer of the UE. The TA-related timer may be maintained by the UE per an RS basis.

Figure 12:
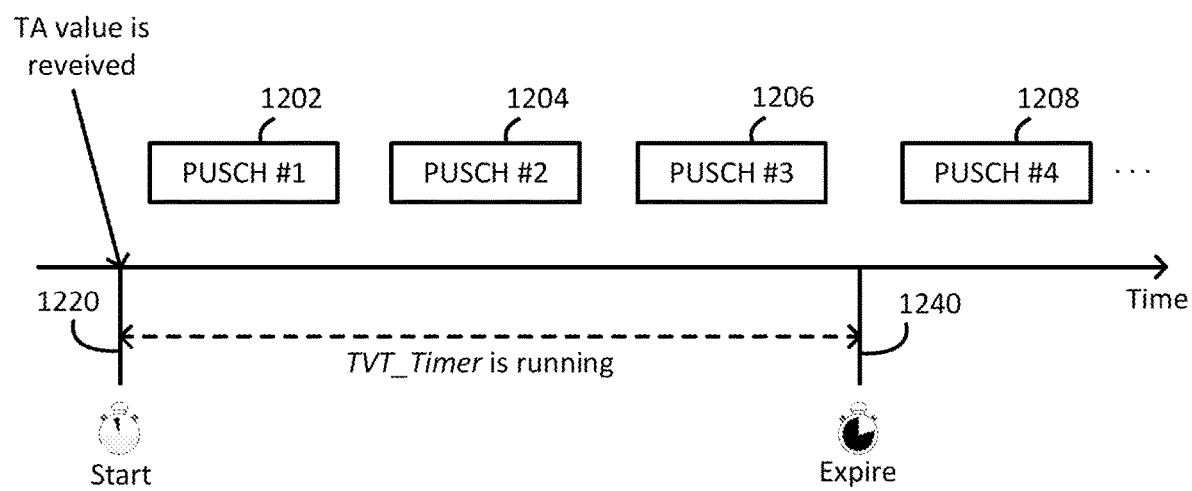
FIG. 12 illustrates an operation of the TA-related timer according to an implementation of the present disclosure.

FIG. 12 illustrates an operation of the TA-related timer according to an implementation of the present disclosure. As illustrated in FIG. 12, the TA-related timer starts at the time point 1220 and expires/stops at the time point 1240. During the time interval between the time points 1220 and 1240, the TA-related timer is considered running.

A TA value may be (or allowed to be) considered valid when the TA-related timer is running. If a currently-stored/received TA value (e.g., the TA value received at (or right before) the time point 1220) is considered valid, the UE may not perform the corresponding RS measurement and RSRP comparison before performing small data transmission on the PUSCH resources derived from the CG. In other words, TA validation check may not be performed when the TA-related timer is running, and may be performed when the TA-related timer is not running. Alternatively, TA validation check may still be performed when the TA-related timer is running. In such a case, a TA value may be considered valid when the condition A-1 (and/or at least one of the restrictions (i) to (iii)) described previously is met and at the same time the TA-related timer is running. The TA value may not be considered valid when the TA-related timer is not running.

A PUSCH resource of CG can be used to transmit small data if the associated TA value is valid. As illustrated in FIG. 12, PUSCH #1 1202, PUSCH #2 1204, PUSCH #3 1206 and PUSCH #4 1208 are PUSCH resources derived from a CG (i.e., PUSCH resources of CG). The UE may perform small data transmission on PUSCH #1 1202, PUSCH #2 1204 and PUSCH #3 1206 since the TA-related timer is running and the associated TA value is considered valid. The UE may not perform data transmission on PUSCH #4 1208 since the TA-related timer is not running and the associated TA value becomes invalid.

The initial value of the TA-related timer may be preconfigured by the BS or predefined in the 3GPP TS. The unit of the TA-related timer may be (a fraction of) a symbol, (a fraction of) a slot, (a fraction of) ms, (a fraction of) a sub-frame, (a fraction of) a system frame, etc.

The TA-related timer may be started or restarted when a TA value is received from the BS. The TA value may indicate how much time in advance the UE should perform an UL transmission to alleviate the impact of propagation delay. As described previously, the TA value may be an absolute timing value that the UE should take into consideration when determining the time-domain position of an UL transmission. The TA value may be an offset in time domain that the UE should take into consideration when adjusting the current TA value for UL transmission.

The TA value may be indicated by a TA command included in an RAR message or a DL MAC CE. The DL MAC CE may be carried by a DL MAC subPDU.

The TA-related timer may be started or restarted when TA validation check procedure is performed and the TA value is considered valid. A PUSCH resource derived from a CG may be considered invalid by the UE if the TA-related timer corresponding to the CG is (re)started/expired within the PUSCH duration.

The TA-related timer may be stopped by the UE when at least one of the following events 1) to 4) occurs:
1) the UE trigger an RRC connection procedure;
2) the CG configuration is released by the UE;
3) the CG configuration is considered as invalid; and
4) a CG configuration release indicator is received from the BS.

The CG configuration release indicator may be included in at least one of the following data formats 1) to 9):
1) a DCI field;
2) a DCI format with CRC bits scrambled by a (pre-configured/pre-defined) RNTI (e.g., CS-RNTI), and/or a specific UE ID described previously;
3) a DL MAC PDU;
4) a MAC subPDU;
5) a (sub)header of a MAC subPDU;
6) a DL MAC CE;
7) a SIB;
8) a specific DCI field (e.g., Short Messages field/Short Messages Indicator included in the DCI format with CRC bits scrambled by a specific RNTI (e.g., P-RNTI)) that instructs the UE to perform a corresponding release procedure;
9) a PDSCH scheduled by a DCI format decoded by the UE in a paging occasion/window (e.g., a DL RRC message or a paging message scheduled by the BS via a specific type of DCI with CRC bits scrambled by a specific RNTI (e.g., P-RNTI)), the PDSCH instructing the UE to perform corresponding release procedure; and Whether the UE could skip a PUSCH of CG may be configured by the network. For example, the UE may be configured a parameter which indicates that the UE whether is allowed to skip the CG resource (e.g., when the MAC PDU includes zero MAC SDUs), wherein the parameter may be included in SD_Config and/or the CG configuration.

A CG configuration may be released (and/or be considered invalid) by the UE if certain condition(s) is satisfied. For example, a CG configuration may be released by the UE if several (consecutive) PUSCH resources of CG are skipped by the UE, where the UE may not transmit any data on the skipped PUSCH resources of CG. Other conditions 1) to 10) to release a CG configuration are described as follows:
1) The number of the skipped PUSCH resources reaches to a threshold.

2) The number of skipped PUSCH resources has reached to a threshold for a period of time.
3) The corresponding TA-related timer expires.
4) The corresponding TA-related timer is stopped by the BS.
5) The UE switches an UL BWP.
6) The UE is switched to apply another CG configuration with a set of PUSCH resources on the current active UL BWP or another UL BWP. For example, the UE may deactivate a first CG configuration and activate a second CG configuration. The deactivated first CG configuration may be released by the UE.
7) The UE receives a paging message that instructs the UE to perform Network Entry.
8) a TA accusation procedure has failed.
9) a specific DCI field (e.g., Short Messages field/Short Messages Indicator included in the DCI format with CRC bits scrambled by a specific RNTI e.g., P-RNTI)) is received, and the specific DCI field instructs the UE to perform a corresponding release procedure;
10) A PDSCH scheduled by a DCI format decoded by the UE in a paging occasion/window (a DL RRC message or a paging message scheduled by the BS via a specific type of DCI with CRC bits scrambled by a specific RNTI (e.g., P-RNTI)) is received, and the PDSCH instructs the UE to perform a corresponding release procedure;

In multi-beam operations, the BS and the UE may have multiple transmitting beams and receiving beams. The BS and the UE may select a beam having the best quality for communication. For example, when beam failure is detected on the serving SSB(s)/CSI-RS(s), the UE may inform the serving BS of a new serving beam (e.g., corresponding to a new SSB or CSI-RS) by initiating a BFR procedure.

The BFR procedure may be triggered by a BFD procedure during which a beam failure indication transmitted to the MAC entity from the lower layer may be counted. Small data transmission may be performed based on the multi-beam operations, as illustrated in FIG. 13.

Figure 13:
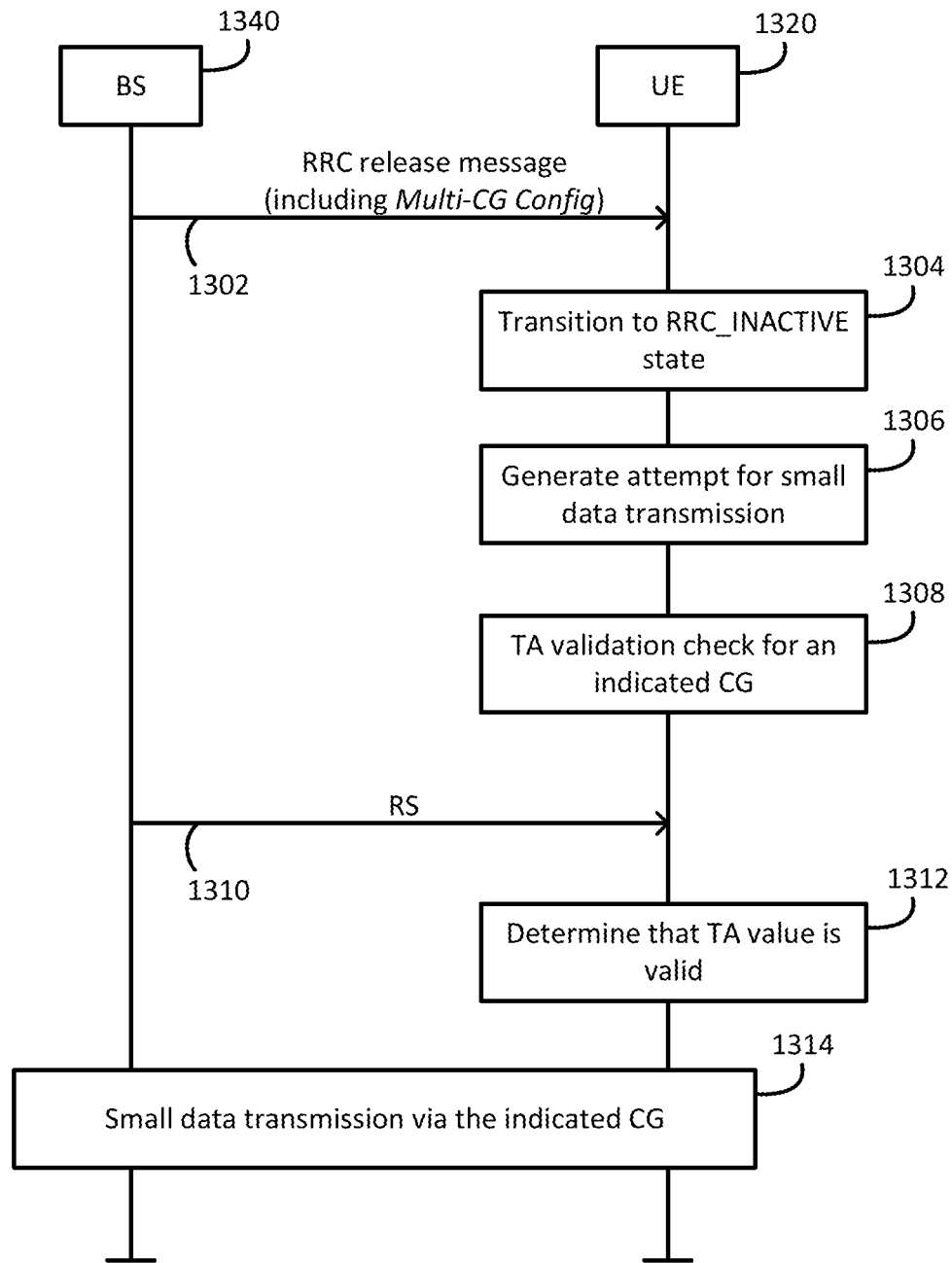
FIG. 13 illustrates a procedure of small data transmission for a UE configured with multi-CG configurations for multi-beam operations according to an implementation of the present disclosure.

FIG. 13 illustrates a procedure of small data transmission for a UE 1320 configured with multi-GG configurations for multi-beam operations according to an implementation of the present disclosure. The multiple CG configurations (Multi-CG config) may be configured by the BS 1340 during or before an RRC release procedure is initiated. Each CG configuration may correspond to a specific beam to be used in the multi-beam operations.

In action 1302, the UE 1320 may receive an RRC release message from the BS 1340. The RRC release message may include multiple CG configurations (Multi-CG Config) for the UE to perform small data transmission in the RRC_INACTIVE state. The RRC release message may also include an RS configuration and association information indicating the association between the DL RS(s) indicated in the RS configuration and the CG configurations (or the CG resource(s) derived from the CG configurations). Each CG configuration may be associated with at least one DL RS. In other words, the association between the CG configurations and the DL RS(s) may have a one-to-one mapping relationship, a one-to-many mapping relationship, a many-to-one mapping relationship, or a many-to-many mapping relationship. For example, in a case of many-to-one mapping, multiple CG configurations may be associated with one DL RS, in a case of one-to-one mapping, each CG configuration may be associated with a different DL RS.

In action 1304, the UE 1320 may transition from the RRC_CONNECTED state to the RRC_INACTIVE state in response to the RRC release message. In action 1306, the UE 1320 (as an RRC_INACTIVE UE) may generate an attempt for small data transmission (e.g., when the AS layer of the UE 1320 has data ready for transmission). In action 1308, the UE 1320 may perform TA validation check for an indicated CG. In action 1310, the UE 1320 may receive a (DL) RS(s) from the BS 1340. If the UE 1320 determines that the associated TA value is valid in action 1312, the UE 1320 may perform small data transmission via the indicated CG in action 1314.

As described previously, when the UE 1320 is in the RRC_INACTIVE state, the UE 1320 may perform TA validation check before applying the PUSCH resource(s) of CG to perform small data transmission. The UE 1320 may apply the PUSCH resource(s) of only one CG configuration at-a-time. For example, the UE 1320 may be configured with two CGs (e.g., CG configuration #1 and CG configuration #2), and there may be only one active CG at-a-time.

Only the PUSCH resource(s) derived from the active CG may be applied for small data transmission. An initial active CG may be indicated by the BS 1340 during the RRC release procedure (e.g., via the RRC release message in action 1302). Once the UE 1320 is provided with a specific CG as the initial active CG for small data transmission in the RRC_INACTIVE state, if an attempt for small data transmission is generated (in action 1306), the UE 1320 may perform TA validation check for the indicated initial active CG (in action 1308) before performing small data transmission. The TA validation check for the indicated initial active CG may be performed based on the measurement result for the RS (received in action 1310) associated with the initial active CG. As described previously, the relationship between the RS and the initial active CG may be indicated by the BS during the RRC release procedure in action 1302. The RS received in action 1310 may be an SSB, a CSI-RS or other types of DL RS(s). In action 1314, the UE 1320 may perform small data transmission via the PUSCH resource(s) derived from the indicated CG (only) when the TA value for the indicated CG is determined valid in action 1312.

An active CG may be indicated by the BS for CG switching. For example, the BS may indicate to the UE to switch the current active CG by transmitting an indicator for CG switching in a DCI field (e.g., Short Messages field/ Short Messages Indicator included in the a DCI format with CRC scrambled by a specific RNTI (e.g., P-RNTI)), a PDSCH scheduled by a DCI format decoded by the UE in its paging occasion/window (e.g., a DL RRC message or a paging message, which is scheduled by the BS via a specific type of DCI with CRC bits scrambled by a specific RNTI (e.g., P-RNTI)), a DCI format with CRC bits scrambled by a (preconfigured/predefined) RNTI (e.g., CS-RNTI) and/or by the specific UE ID described previously, a DL MAC PDU, a MAC subPDU, a (sub)header of a MAC subPDU, a DL MAC CE, and/or a SIB. For example, a DL MAC CE may include a bitmap (as an indicator for CG switching) for indicating to the UE to switch the active CG. Each bit of the bitmap may be associated with one of the multiple configured CG configurations. For example, the bit may be set to "1" to indicate that the UE should activate the associated CG configuration, and may be set "0" to indicate that the UE should deactivate the associated CG configuration. The UE may monitor a PDCCH/CORESET/CSS/USS on a BWP and/or a serving cell to receive the indicator for CG switching. CG switching may refer to a process of switching an active CG from one to another among the CGs within the same UL BWP, or a process of switching an active CG from one to another among the CGs in different UL BWPs.

The UE may switch the active CG by itself instead of being indicated by the BS. For example, when a specific timer expires (e.g., the TA-related timer), the UE may switch the active CG from one to another (i.e., from a current active CG to a target CG). To determine the target CG in the CG switching process, the UE may perform a CG selection procedure during which the UE may perform an overall RS measurement on a set of RSs and select one of the CGs as the target CG according to the measurement result (e.g., the RSRP of each RS in the set of RSs). A signal-quality-related threshold (e.g., an RSRP threshold) may be configured by the BS. A CG may be selected as the target CG if the RSRP of the associated RS is larger than, or equal to, the signal-quality-related threshold. The current active CG and/or all CGs which have been used in or selected for small data transmission may be excluded from the CG selection procedure. For example, if the current active CG is excluded from the CG selection procedure, the current active CG is not selected as the target CG no matter whether the RSRP of the current active CG is larger than, or equal to, the signal-quality-related threshold.

Figure 14:
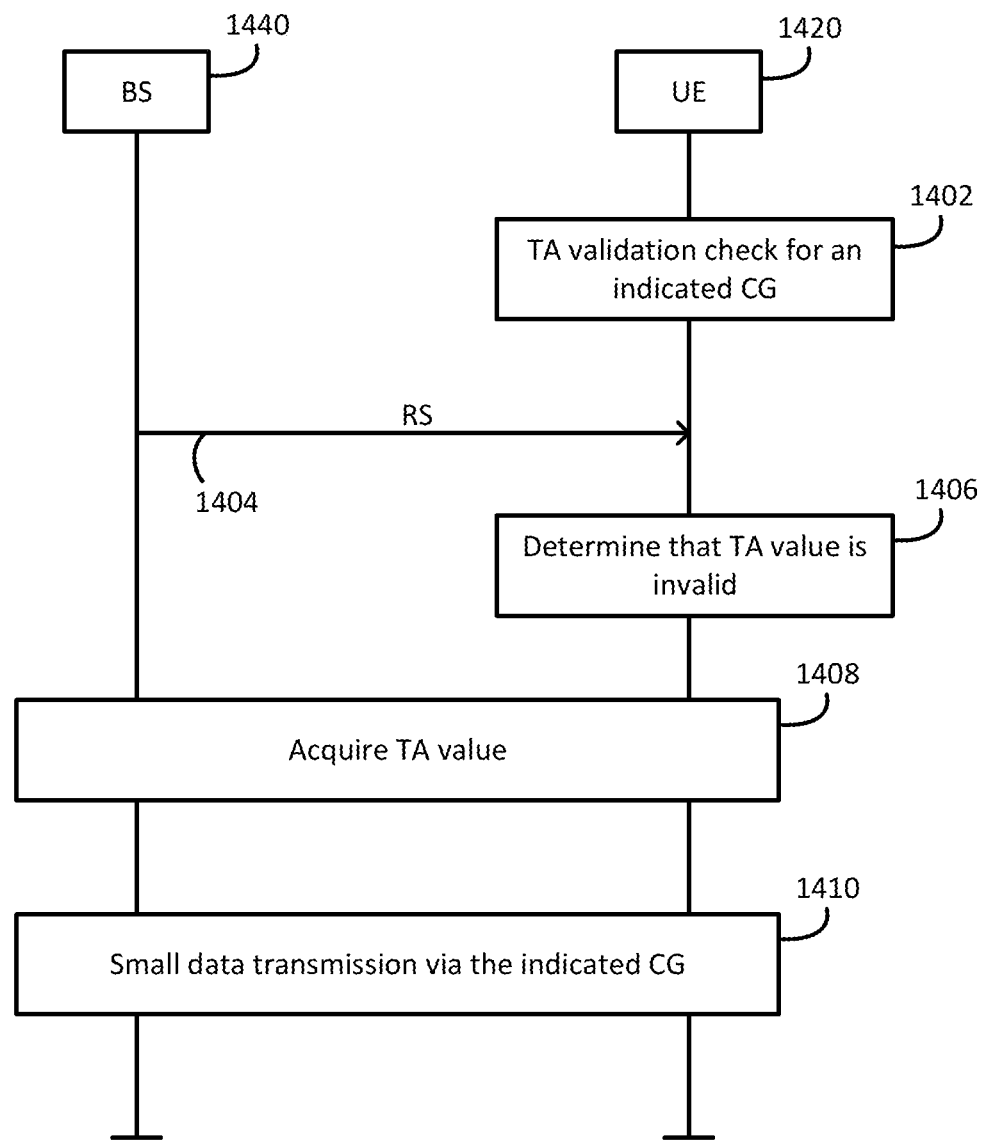
FIG. 14 illustrates a procedure of small data transmission with TA acquisition mechanism according to an implementation of the present disclosure.

If the TA validation check for an indicated CG has failed (i.e., the TA value corresponding to the indicated CG is invalid), the UE may use TA acquisition mechanism to acquire a valid TA value from the BS, as illustrated in FIG. 14.

FIG. 14 illustrates a procedure of small data transmission with a TA acquisition mechanism according to an implementation of the present disclosure.

In action 1402, the UE 1420 may perform TA validation check for an indicated CG. In action 1404, the UE 1420 may receive a (DL) RS from the BS 1440. If the TA value for the indicated CG associated with the RS is determined invalid in action 1406, the UE 1420 may perform a TA accusation procedure to acquire a valid TA value that supports small data transmission via the indicated CG in action 1408. In action 1410, the UE 1420 may perform small data transmission via the indicated CG by using the newly-acquired valid TA value.

The UE may be configured with a CG-specific RA resource. The BS may provide the UE with association information indicating the association between the CG configurations and the CG-specific RA resources during the RRC release procedure (e.g., via the RRC release message). If the TA value is invalid, the UE may initiate an RA procedure by applying the RA resource associated with the CG. The TA value may be received in an MSGB, an MSG2 or an MSG4 during the initiated RA procedure. The UE may perform small data transmission on the CG by applying the TA value received in the initiated RA procedure.

The TA-related timer may be (re)started upon the UE receives a valid TA value. The UE may initiate an RA procedure by applying the RA resource associated with the indicated CG or the current active CG. The BS may instruct the UE to switch the active CG via an MSGB/MSG2/MSG4 during an RA procedure. The BS may implicitly instruct the UE to switch the active CG by providing a TA value for another CG configuration. The BS may provide the UE with association information indicating the association between the RA resources (or RA resource sets) and the CORESETs during an RRC release procedure via the RRC release message. The BS may instruct the UE to perform CG switching from the current active CG to a CG associated with an RA resource by transmitting an acknowledgment on a CORESET associated with the RA resource, where the acknowledgment may be transmitted in response to a PRACH preamble on the RA resource. The acknowledgment may include a reconfiguration of a DL RS or an UL CG resource. The acknowledgment may include a TA adjustment value.

Before the UE initiates an RA procedure for acquiring a TA value, the UE may perform a CG selection procedure described previously. During the CG selection procedure, the UE may select a target CG based on certain RS measurement results. A suitable CG may be selected as the target CG. For example, a CG corresponding to an RA resource may be applied by the UE to initiate an RA procedure for acquiring a valid TA value.

The UE may acquire a TA value by initiating an RRC resume procedure. Once an RA procedure is initiated by the UE, the UE may transmit a TA accusation request to the BS by including the TA accusation request in an MSG1/MSGA/MSG3 during the RA procedure. The BS may transmit a TA value, as a response to the TA accusation request, to the UE.

The TA accusation request may be transmitted by the UE via a PUSCH resource on a specific CG. The UE may release the specific CG if the corresponding TA accusation procedure has been triggered but failed.

The validity of a TA value may be different for different CGs. For example, even if a TA value is determined invalid for an indicated CG, the TA value may be still valid for other CG configuration(s). For example, after determining that a TA value is invalid (for an indicated CG), the UE may measure the RSRP of other DL RSs associated with other configured CG configurations and compare the measurement result with an RSRP offset preconfigured by the BS. According to the comparison result, the UE determine whether the TA value is applicable for data transmission via a new selected CG.

The UE may transmit an indicator to the BS on a PUSCH/PUCCH/PRACH to notify that the UE has switched the active CG. The indicator may be included in an UL MAC CE, an RRC message, or an RRC IE.

The UE may apply a newly-selected CG for data transmission (only) when the UE receives an acknowledgement (e.g., HARQ feedback/DCI field/DL MAC CE) from the BS.

The UE may consider a specific resource (e.g., a PUSCH of CG) is invalid when the corresponding TA value is invalid. For example, the specific resource may be considered invalid when the following condition A-2 is satisfied:

$$(\text{RSRP\_ref\_0} - \text{RSRP\_meas\_0}) > \text{RSRP threshold} \qquad (A\text{-}2)$$

where RSRP_meas_0 is a measured RSRP level obtained at the time of CG resource validation (e.g., during the time interval 1120 in FIG. 11) based on an RS associated with the CG resource of the CG configuration, and RSRP_ref_0 is a reference RSRP level which may be a previously-stored measurement result of the UE. For example, before the time the UE measures RSRP_meas_0, the UE may measure the RS associated with the CG resource of the CG configuration and store the corresponding measurement result as the previously-stored measurement result.

If the UE receives a TA command in an RAR/MAC CE, or if the UE activates a CG resource, the UE may set the RSRP_ref_0 as the measured RSRP level according to the measurement result of the RS associated with the activated CG resource.

For example, the specific resource may be considered invalid when the following condition A-3 is satisfied:

$$(\text{RSRP\_ref\_1} - \text{RSRP\_meas\_1}) > \text{RSRP threshold} \qquad (A\text{-}3)$$

where RSRP_ref_1 is the reference RSRP level, and RSRP_meas_1 may be one of the followings:

the measured RSRP level obtained during TA validation check;

the RSRP level measured on the RS associated with the activated CG resource;

the highest RSRP level among the RSRP level of the RS associated with the activated CG resource and the RSRP level of the RS associated with the deactivated CG resource; and an average RSRP level obtained by averaging the RSRP level of the RS associated with the activated CG resource and the RSRP level of the RS associated with the deactivated CG resource.

If the UE receives a TA command in an RAR message or a TA command MAC CE, or if the UE activates a CG resource, the UE may set the RSRP_ref_1 to the measured RSRP level of the RS associated with the activated CG resource.

Figure 15:
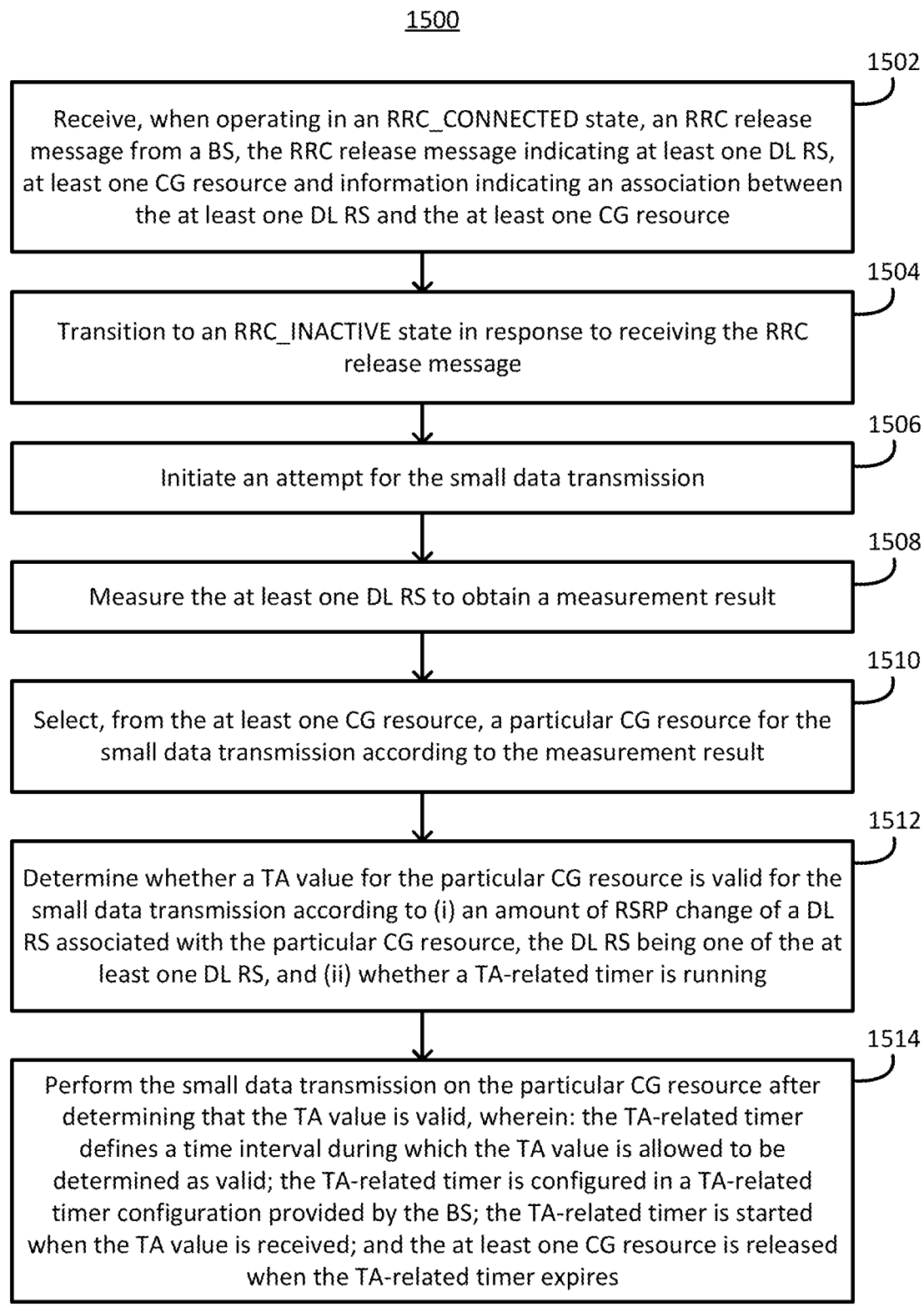
FIG. 15 illustrates a flowchart for a method performed by a UE for small data transmission according to an implementation of the present disclosure.

FIG. 15 illustrates a flowchart for a method 1500 performed by a UE for small data transmission according to an implementation of the present disclosure. Although actions 1502, 1504, 1506, 1508, 1510, 1512 and 1514 are illustrated as separate actions represented as independent blocks in FIG. 15, these separately illustrated actions should not be construed as necessarily order-dependent. The order in which the actions are performed in FIG. 15 is not intended to be construed as a limitation, and any number of the disclosed blocks may be combined in any order to implement the method, or an alternate method. Moreover, each of actions 1502, 1504, 1506, 1508, 1510, 1512 and 1514 may be performed independent of other actions, and can be omitted in some implementations of the present disclosure.

In action 1502, the UE may receive, when operating in an RRC_CONNECTED state, an RRC release message from a BS. The RRC release message may indicate at least one DL RS, at least one CG resource and information indicating an association between the at least one DL RS and the at least one CG resource. The RRC configurations (e.g., SD_Config) described previously may also be included in the RRC release message.

The information may include at least one RS ID and at least one CG configuration ID. The at least one RS ID may indicate the at least one DL RS. The at least one CG configuration ID may indicate at least one CG configuration that configures the at least one CG resource. The at least one RS ID and the at least one CG configuration indicated by the RRC release message may have a one-to-one mapping relationship, a one-to-many mapping relationship, a many-to-one mapping relationship, or a many-to-many mapping relationship. For example, in a case of many-to-one mapping, the at least one RS ID may include a first RS ID and a second RS ID, and the first RS ID and the second RS ID may be associated with the same CG configuration indicated by the at least one CG configuration ID. In a case of many-to-many or one-to-one mapping, the at least one RS ID may include a first RS ID and a second RS ID, and the first RS ID and the second RS ID may be associated with different CG configurations indicated by the at least one CG configuration ID.

In action 1504, the UE may transition/switch (from the RRC_CONNECTED state) to an RRC_INACTIVE state in response to receiving the RRC release message.

In action 1506, the UE may initiate an attempt for the small data transmission. As described previously, the attempt for the small data transmission may be generated when the AS layer of the UE has data ready for transmission.

In action 1508, the UE may measure the at least one DL RS (indicated in the RRC release message) to obtain a measurement result.

In action 1510, the UE may select, from the at least one CG resource (indicated in the RRC release message), a particular CG resource for the small data transmission according to the measurement result.

In action 1512, the UE may determine whether a TA value for the particular CG resource is valid for the small data transmission according to the following two factors (i) and (ii):

(i) an amount of RSRP change of a DL RS associated with the particular CG resource, the DL RS being one of the at least one DL RS, and (ii) whether a TA-related timer is running.

In action 1514, the UE may perform the small data transmission on the particular CG resource after determining that the TA value is valid. In one example, only after determining that the TA value is valid, the UE may perform the small data transmission on the particular CG resource.

The TA-related timer may define a time interval during which the TA value is allowed to be determined as valid. The TA-related timer may be configured in a TA-related timer configuration provided by the BS (e.g., via an RRC message). The TA-related timer may be started or restarted when the TA value is received. The at least one CG resource may be released when the TA-related timer expires.

Figure 16:
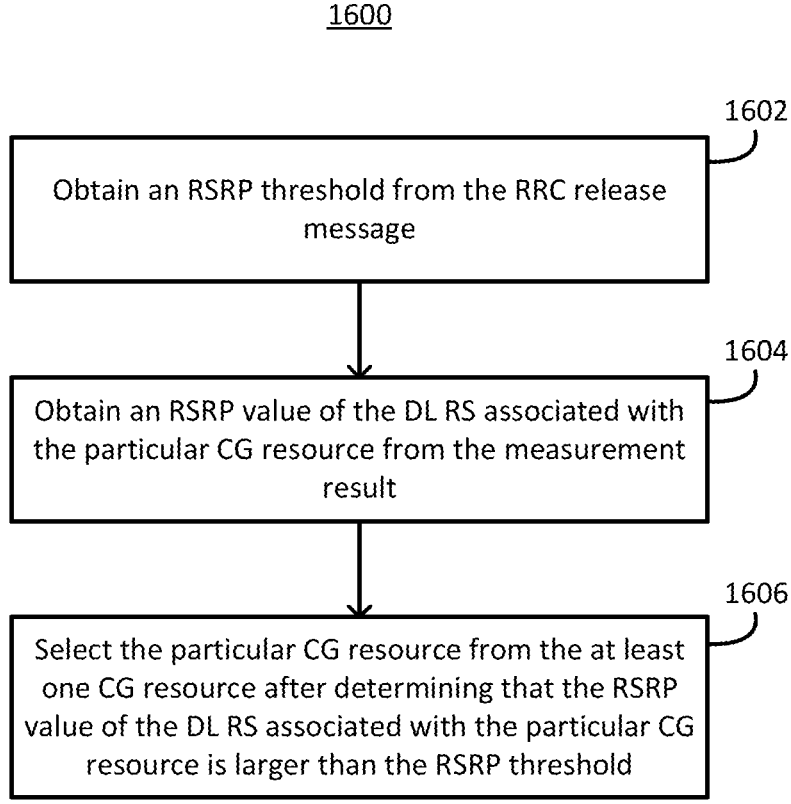
FIG. 16 illustrates a process of CG resource selection according to an implementation of the present disclosure.

FIG. 16 illustrates a process 1600 of CG resource selection according to an implementation of the present disclosure. The particular CG resource described in action 1510 of FIG. 15 may be determined based on the process 1600. In other words, according to the process 1600, one of the CG resource(s) indicated by the RRC release message may be selected as the particular CG resource if the RSRP value of the DL RS associated with the particular CG resource is larger than an RSRP threshold.

As illustrated in FIG. 16, in action 1602, the UE may obtain an RSRP threshold from the RRC release message. In action 1604, the UE may obtain an RSRP value of the DL RS associated with the particular CG resource from the measurement result. In action 1606, the UE may select the particular CG resource from the at least one CG resource after determining that the RSRP value of the DL RS associated with the particular CG resource is larger than the RSRP threshold.

Figure 17:
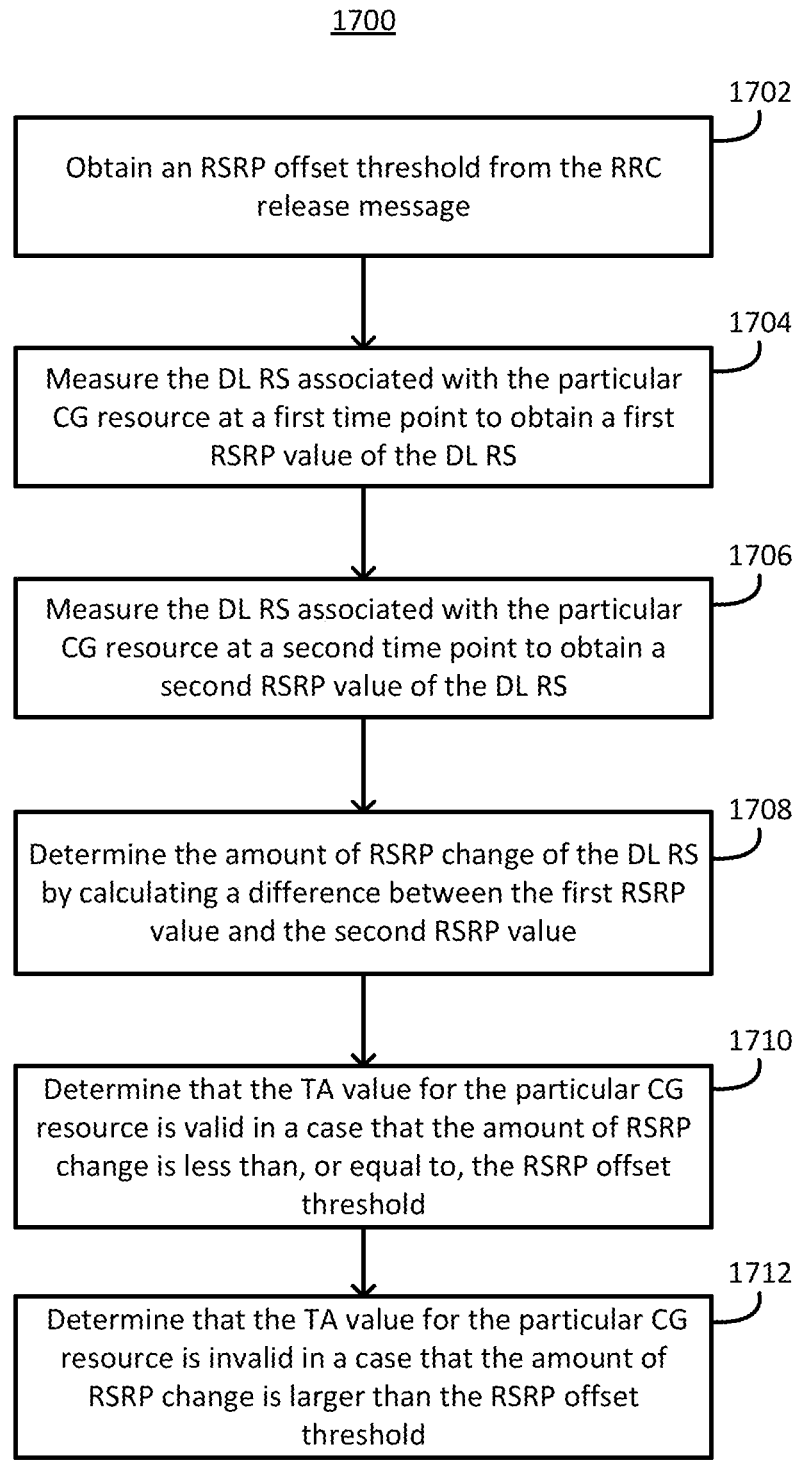
FIG. 17 illustrates a process of determining the validity of a TA value according to an implementation of the present disclosure.

FIG. 17 illustrates a process 1700 of determining the validity of a TA value according to an implementation of the present disclosure. The process 1700 may be included in action 1512 of FIG. 15 for determining the amount of RSRP change of the DL RS associated with the particular resource.

In action 1702, the UE may obtain an RSRP offset threshold from the RRC release message. In action 1704, the UE may measure the DL RS associated with the particular CG resource at a first time point to obtain a first RSRP value of the DL RS. In action 1706, the UE may measure the DL RS associated with the particular CG resource at a second time point to obtain a second RSRP value of the DL RS. In action 1708, the UE may determine the amount of RSRP change of the DL RS by calculating a difference between the first RSRP value and the second RSRP value.

As described previously, the difference between the first RSRP value and the second RSRP value may be considered as the amount of RSRP change of the DL RS within a time period (from the first time point to the second time point). If the second time point is earlier than the first time point in time domain, the second RSRP value may be considered as a previously-stored measurement result compared to the first RSRP value. In such a case, condition A-1 may be applied to check the validity of the TA value for the particular CG resource.

As illustrated in FIG. 17, in action 1710, the UE may determine that the TA value for the particular CG resource is valid in a case that the amount of RSRP change is less than, or equal to, the RSRP offset threshold. In action 1712, the UE may determine that the TA value for the particular CG resource is invalid in a case that the amount of RSRP change is larger than the RSRP offset threshold.

The UE behavior(s) described in the present disclosure is more flexible and applicable for advanced scenarios, e.g., small data transmission in an RRC_INACTIVE state, compared with LTE scenarios. At least a portion of the UE behavior(s) disclosed herein supports small data transmission via a CG in an RRC_INACTIVE state, and improves the performance of small data transmission and the utilization efficiency of CG resources by taking the TA validity into consideration.

The UE behaviors in the RRC_INACTIVE state in the present disclosure may also be applicable to the RRC_IDLE state or other RRC sub-state(s) (e.g., the RRC sub-state belonging to the RRC_CONNECTED state).

The RS ID described previously may be replaced by an ID that explicitly or implicitly indicates a new beam.

The DL RRC message described previously may be an RRC reconfiguration message (RRCReconfiguration), an RRC release message (RRCResume), an RRC reestablishment message (RRCReestablishment), an RRC setup message (RRCSetup) or any other unicast DL RRC message.

It is noted that the "beam" in the present disclosure is equivalent to a spatial (domain) filtering. In one example, the spatial filtering is applied in analog domain by adjusting phase and/or amplitude of the signal before transmitted by a corresponding antenna element. In another example, the spatial filtering is applied in digital domain by Multi-input Multi-output (MIMO) technique in wireless communication system. For example, a UE made a PUSCH transmission by using a specific beam means the UE made the PUSCH transmission by using the specific spatial/digital domain filter. The "beam" may also be but not limited to be represented as an antenna, an antenna port, an antenna element, a group of antennas, a group of antenna ports, or a group of antenna elements. The beam may also be formed by a certain RS resource. In brief, the beam can be equivalent to a spatial domain filter which radiated the EM wave through.

It is noted that "transmitted" in the present disclosure can be defined as corresponding MAC CE/MAC PDU/layer 1 signaling/higher layer signaling, is started to be transmitted or completely transmitted or is already delivered to corresponding HARQ process/buffer for transmission. Further, "transmitted" in the present disclosure can also be defined as the HARQ_ACK feedback (response from BS) of the MAC PDU carrying the MAC CE/MAC PDU/layer 1 signaling/higher layer signaling is received. Moreover, "transmitted" in the present disclosure can also be defined as corresponding constructing a MAC CE/MAC PDU. It is noted that "HARQ_ACK feedback" can be implemented as a DCI format 0_0, 0_1 or as some other format of DCI received by the UE from the BS via a PDCCH. The received DCI contains a new data indicator (NDI) which is set to a specific value (e.g., set to 1) and the DCI also indicates a HARQ process ID which is the same as a HARQ process ID applied by/indicated to be used for the HARQ process of the MAC PDU (carrying the BFRQ MAC CE) transmission.

The PDCCH in the present disclosure is transmitted by the BS to the UE. Or we can say the PDCCH is received by the UE from the BS. The PDSCH in the present disclosure is transmitted by the BS to the UE. Or we can say the PDSCH is received by the UE from the BS. The PUSCH in the present disclosure is transmitted by the UE to the BS. Or we can say the PUCCH is received by the BS from the UE.

A PDSCH/PDSCH/PUSCH transmission may span multiple symbols in a time domain. A time duration of a PDSCH/PDSCH/PUSCH (transmission) implies a time interval starting from the beginning of the first symbol of the PDSCH/PDSCH/PUSCH (transmission) and ending at the end of the last symbol of the PDSCH/PDSCH/PUSCH (transmission).

The term "acknowledgement" may have the same meaning as "HARQ-ACK" or "HARQ-ACK feedback" in the present disclosure.

The following further discloses terms, examples, embodiments, actions, and/or behaviors in the present disclosure:

Cell: Radio network object that can be uniquely identified by a User Equipment from a (cell) identification that is broadcasted over a geographical area from one UTRAN Access Point. A Cell is either FDD or TDD mode.

Serving Cell: For a UE in RRC_CONNECTED not configured with CA/Dual Connectivity (DC) there is only one serving cell comprising of the primary cell. For a UE in RRC_CONNECTED configured with CA/DC the term 'serving cells' is used to denote the set of cells comprising of the Special Cell(s) and all secondary cells.

CA: In Carrier Aggregation (CA), two or more Component Carriers (CCs) are aggregated. A UE may simultaneously receive or transmit on one or multiple CCs depending on its capabilities. CA is supported for both contiguous and non-contiguous CCs. When CA is deployed frame timing and SFN are aligned across cells that can be aggregated. The maximum number of configured CCs for a UE is 16 for DL and 16 for UL. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the Primary Cell (PCell). Depending on UE capabilities, Secondary Cells (SCells) can be configured to form together with the PCell a set of serving cells. The configured set of serving cells for a UE therefore always consists of one PCell and one or more SCells.

Configured Grant (CG): gNB allocates UL resources for the initial HARQ transmissions to UEs. Two types of CGs are defined:

Type 1: RRC directly provides the configured UL grant (including the periodicity).

Type 2: RRC defines the periodicity of the configured UL grant while PDCCH addressed to CS-RNTI can either signal and activate the configured UL grant, or deactivate it; i.e., a PDCCH addressed to CS-RNTI indicates that the UL grant can be implicitly reused according to the periodicity defined by RRC, until deactivated.

When a configured UL grant is active, if the UE cannot find its C-RNTI/CS-RNTI/MCS-C-RNTI on the PDCCH(s), an UL transmission according to the configured UL grant can be made. Otherwise, if the UE finds its C-RNTI/CS-RNTI/MCS-C-RNTI on the PDCCH(s), the PDCCH allocation overrides the configured UL grant. It is noted that, the usage of MCS-C-RNTI is equivalent to that of C-RNTI in MAC procedures (except for the C-RNTI MAC CE).

HARQ: A functionality ensures delivery between peer entities at Layer 1 (i.e., Physical Layer). A single HARQ process supports one Transport Block (TB) when the physical layer is not configured for downlink/UL spatial multiplexing, and when the physical layer is configured for downlink/uplink spatial multiplexing, a single HARQ process supports one or multiple TBs. There is one HARQ entity per serving cell. Each of HARQ entity supports a parallel (number) of DL and UL HARQ process.

Hybrid automatic repeat request acknowledgement (HARQ-ACK): A HARQ-ACK information bit value of 0 represents a negative acknowledgement (NACK) while a HARQ-ACK information bit value of 1 represents a positive acknowledgement (ACK).

Timer: A MAC entity can setup one or more timers for individual purposes, for example, triggering some UL signaling retransmission or limiting some UL signaling retransmission period. A timer is running once it is started, until it is stopped or until it expires; otherwise, it is not running. A timer can be started if it is not running or restarted if it is running. A Timer is always started or restarted from its initial value. Wherein the initial value can be but not limited to be configured by the gNB via downlink RRC signaling or be pre-defined/pre-determined value addressed in some specification.

BWP: A subset of the total cell bandwidth of a cell is referred to as a Bandwidth Part (BWP) and BA is achieved by configuring the UE with BWP(s) and telling the UE which of the configured BWPs is currently the active one. To enable Bandwidth Adaptation (BA) on the PCell, the gNB configures the UE with UL and DL BWP(s). To enable BA on SCells in case of CA, the gNB configures the UE with DL BWP(s) at least (i.e., there may be none in the UL). For the PCell, the initial BWP is the BWP used for initial access. For the SCell(s), the initial BWP is the BWP configured for the UE to first operate at SCell activation. UE may be configured with a first active UL BWP by a firstActiveUplinkBWP IE. If the first active UL BWP is configured for an SpCell, the firstActiveUplinkBWP IE field contains the ID of the UL BWP to be activated upon performing the RRC (re-)configuration. If the field is absent, the RRC (re-)configuration does not impose a BWP switch. If the first active UL BWP is configured for an SCell, the firstActiveUplinkBWP IE field contains the ID of the UL bandwidth part to be used upon MAC-activation of an SCell.

PDCCH: In the downlink, the gNB can dynamically allocate resources to UEs via the C-RNTI/MCS-C-RNTI/CS-RNTI on PDCCH(s). A UE always monitors the PDCCH(s) in order to find possible assignments when its downlink reception is enabled (activity governed by DRX when configured). When CA is configured, the same C-RNTI applies to all serving cells.

PDSCH/PUSCH: The PDCCH can be used to schedule DL transmissions on PDSCH and UL transmissions on PUSCH Time Alignment Timer: The timer is for the maintenance of UL time alignment. Wherein the timeAlignmentTimer is according to a timing advance group maintained. The timer controls how long the MAC entity considers the Serving Cells belonging to the associated TAG to be UL time aligned. The initial value of the timer is configured by the gNB.

SLIV: Start and Length Indicator for the time domain allocation for PUSCH/PDSCH. It defines the start symbol and the number of consecutive symbols for PUSCH/PDSCH allocation.

Transport Block: The data from the upper layer (or MAC) given to the physical layer is basically referred as transport block.

LBT: The gNB and UE may apply Listen-Before-Talk (LBT) before performing a transmission on NR-U cells. When LBT is applied, the transmitter listens to/senses the channel to determine whether the channel is free or busy and performs transmission only if the channel is sensed free.

NR-U: NR Radio Access operating in Unlicensed Spectrum (referred to as NR-U) can operate in a PCell, an SCell, or a PSCell.

The terms, definitions and abbreviations in the present disclosure are either imported from existing documentation (ETSI, ITU or elsewhere) or newly created by 3GPP experts whenever the need for precise vocabulary was identified.

Figure 18:
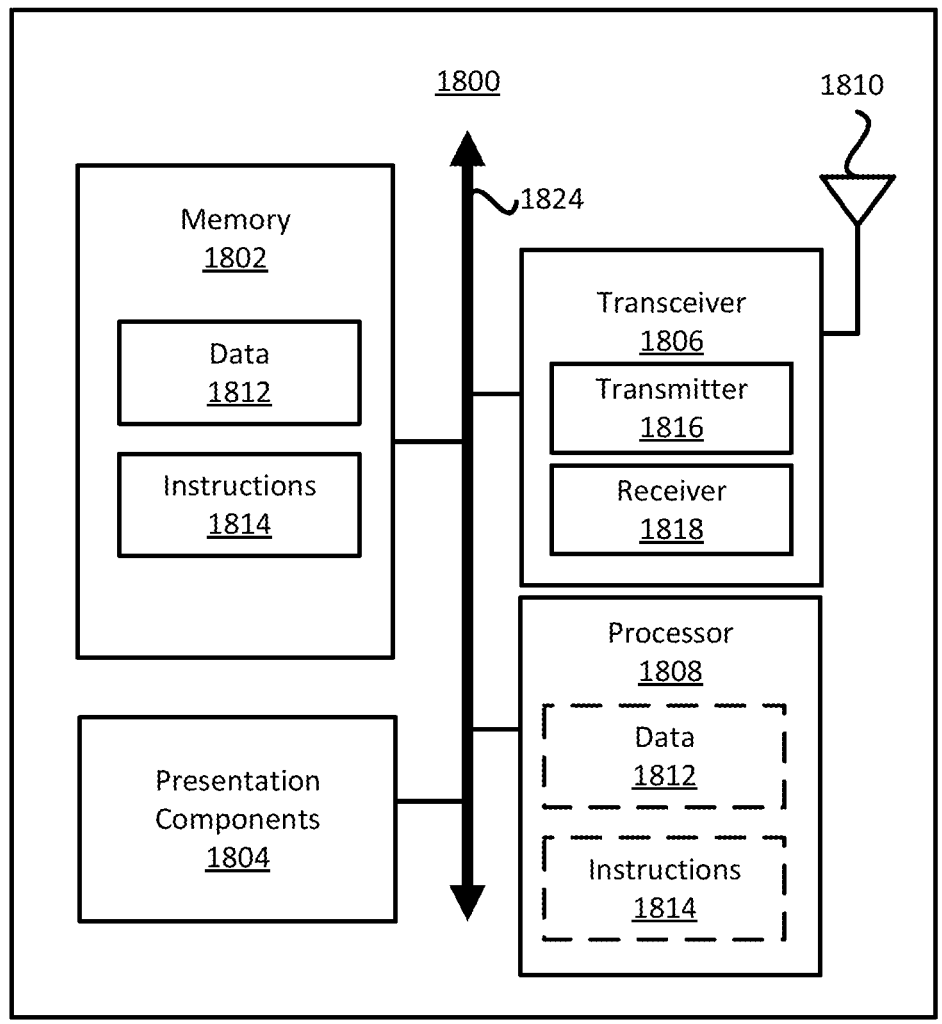
FIG. 18 illustrates a block diagram of a node for wireless communication according to an implementation of the present disclosure.

FIG. 18 illustrates a block diagram of a node 1800 for wireless communication according to an implementation of the present disclosure. As illustrated in FIG. 18, the node 1800 may include a transceiver 1806, a processor 1808, a memory 1802, one or more presentation components 1804, and at least one antenna 1810. The node 1800 may also include an RF spectrum band module, a BS communications module, a network communications module, and a system communications management module, Input/Output (I/O) ports, I/O components, and a power supply (not explicitly illustrated in FIG. 18).

Each of these components may be in communication with each other, directly or indirectly, over one or more buses 1824. The node 1800 may be a UE or a BS that performs various functions in the present disclosure, for example, with reference to FIGS. 1 through 17.

The transceiver 1806 having a transmitter 1816 (e.g., transmitting/transmission circuitry) and a receiver 1818 (e.g., receiving/reception circuitry) may be configured to transmit and/or receive time and/or frequency resource partitioning information. The transceiver 1806 may be configured to transmit in different types of subframes and slots, including, but not limited to, usable, non-usable and flexibly usable subframes and slot formats. The transceiver 1806 may be configured to receive data and control channels.

The node 1800 may include a variety of computer-readable media. Computer-readable media can be any available media that can be accessed by the node 1800 and include both volatile (and non-volatile) media and removable (and non-removable) media. By way of example, and not limitation, computer-readable media may include computer storage media and communication media. Computer storage media may include both volatile (and/or non-volatile) and removable (and/or non-removable) media implemented according to any method or technology for storage of information such as computer-readable instructions, data structures, program modules, or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal.

Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. Combinations of any of the previously disclosed communication media should also be included within the scope of computer-readable media.

The memory 1802 may include computer storage media in the form of volatile and/or non-volatile memory. The memory 1802 may be removable, non-removable, or a combination thereof. For example, the memory 1802 may include solid-state memory, hard drives, optical-disc drives, etc. As illustrated in FIG. 18, the memory 1802 may store computer-readable and/or computer-executable instructions 1814 (e.g., software code(s) or computer-executable program(s)) that are configured to, when executed, cause the processor 1808 to perform various functions in the present disclosure, for example, with reference to FIGS. 1 through 17. Alternatively, the instructions 1814 may not be directly executable by the processor 1808 but may be configured to cause the node 1800 (e.g., when compiled and executed) to perform various functions in the present disclosure.

The processor 1808 (e.g., having processing circuitry) may include an intelligent hardware device, a Central Processing Unit (CPU), a microcontroller, an ASIC, etc. The processor 1808 may include memory. The processor 1808 may process the data 1812 and the instructions 1814 received from the memory 1802, and information through the transceiver 1806, the baseband communications module, and/or the network communications module. The processor 1808 may also process information to be sent to the transceiver 1806 for transmission through the antenna 1810, to the network communications module for transmission to a CN.

One or more presentation components 1804 may present data indications to a person or other devices. Examples of presentation components 1804 may include a display device, speaker, printing component, vibrating component, etc.

From the present disclosure, it is manifested that various techniques may be used for implementing the concepts described in the present application without departing from the scope of those concepts. Moreover, while the concepts have been disclosed with specific reference to certain implementations, a person of ordinary skill in the art would recognize that changes may be made in form and detail without departing from the scope of those concepts. As such, the disclosed implementations are to be considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:

1. A method performed by a User Equipment (UE) for small data transmission, the method comprising:
   receiving, when operating in a Radio Resource Control (RRC)_CONNECTED state, an RRC release message from a Base Station (BS), the RRC release message indicating at least one downlink (DL) Reference Signal (RS), at least one Configured Grant (CG) resource and information indicating an association between the at least one DL RS and the at least one CG resource;
   transitioning to an RRC_INACTIVE state in response to receiving the RRC release message;
   initiating an attempt for the small data transmission;
   measuring the at least one DL RS to obtain a measurement result;
   selecting, from the at least one CG resource, a particular CG resource for the small data transmission according to the measurement result;
   determining whether a Timing Advance (TA) value for the particular CG resource is valid for the small data transmission according to (i) an amount of Reference Signal Received Power (RSRP) change of a DL RS associated with the particular CG resource, the DL RS being one of the at least one DL RS, and (ii) whether a TA-related timer is running; and
   performing the small data transmission on the particular CG resource after determining that the TA value is valid, wherein:
   the TA-related timer defines a time interval during which the TA value is allowed to be determined as valid;
   the TA-related timer is configured by a TA-related timer configuration provided by the BS;
   the TA-related timer is started when the TA value is received; and
   the at least one CG resource is released when the TA-related timer expires.

2. The method according to claim 1, further comprising:
   obtaining an RSRP threshold from the RRC release message;
   obtaining an RSRP value of the DL RS associated with the particular CG resource from the measurement result; and
   selecting the particular CG resource from the at least one CG resource after determining that the RSRP value of the DL RS associated with the particular CG resource is larger than the RSRP threshold.

3. The method according to claim 1, wherein the association information includes at least one RS identifier (ID) and at least one CG configuration ID, the at least one RS ID indicates the at least one DL RS, and the at least one CG configuration ID indicates at least one CG configuration that configures the at least one CG resource.

4. The method according to claim 3, wherein the at least one RS ID includes a first RS ID and a second RS ID, and the first RS ID and the second RS ID are associated with a same CG configuration indicated by the at least one CG configuration ID.

5. The method according to claim 3, wherein the at least one RS ID includes a first RS ID and a second RS ID, and the first RS ID and the second RS ID are associated with different CG configurations indicated by the at least one CG configuration ID.

6. The method according to claim 1, further comprising:
   obtaining an RSRP offset threshold from the RRC release message;
   measuring the DL RS associated with the particular CG resource at a first time point to obtain a first RSRP value of the DL RS;
   measuring the DL RS associated with the particular CG resource at a second time point to obtain a second RSRP value of the DL RS;
   determining the amount of RSRP change of the DL RS by calculating a difference between the first RSRP value and the second RSRP value; and
   determining that the TA value for the particular CG resource is valid in a case that the amount of RSRP change is less than, or equal to, the RSRP offset threshold; and
   determining that the TA value for the particular CG resource is invalid in a case that the amount of RSRP change is larger than the RSRP offset threshold.

7. A User Equipment (UE) for small data transmission, the UE comprising:
- a processor; and
- a memory coupled to the processor, wherein the memory stores at least one computer-executable program that, when executed by the processor, causes the processor to:
- receive, when operating in a Radio Resource Control (RRC)_CONNECTED state, an RRC release message from a Base Station (BS), the RRC release message indicating at least one downlink (DL) Reference Signal (RS), at least one Configured Grant (CG) resource and information indicating an association between the at least one DL RS and the at least one CG resource;
- transition to an RRC_INACTIVE state in response to receiving the RRC release message;
- initiate an attempt for the small data transmission;
- measure the at least one DL RS to obtain a measurement result;
- select, from the at least one CG resource, a particular CG resource for the small data transmission according to the measurement result;
- determine whether a Timing Advance (TA) value for the particular CG resource is valid for the small data transmission according to (i) an amount of Reference Signal Received Power (RSRP) change of a DL RS associated with the particular CG resource, the DL RS being one of the at least one DL RS, and (ii) whether a TA-related timer is running; and
- perform the small data transmission on the particular CG resource after determining that the TA value is valid, wherein:
- the TA-related timer defines a time interval during which the TA value is allowed to be determined as valid;
- the TA-related timer is configured by a TA-related timer configuration provided by the BS;
- the TA-related timer is started when the TA value is received; and
- the at least one CG resource is released when the TA-related timer expires.

8. The UE according to claim 7, wherein when the at least one computer-executable program is executed by the processor, the computer-executable program further causes the processor to:
- obtain an RSRP threshold from the RRC release message;
- obtain an RSRP value of the DL RS associated with the particular CG resource from the measurement result; and
- select the particular CG resource from the at least one CG resource after determining that the RSRP value of the DL RS associated with the particular CG resource is larger than the RSRP threshold.

9. The UE according to claim 7, wherein the association information includes at least one RS identifier (ID) and at least one CG configuration ID, the at least one RS ID indicates the at least one DL RS, and the at least one CG configuration ID indicates at least one CG configuration that configures the at least one CG resource.

10. The UE according to claim 9, wherein the at least one RS ID includes a first RS ID and a second RS ID, and the first RS ID and the second RS ID are associated with a same CG configuration indicated by the at least one CG configuration ID.

11. The UE according to claim 9, wherein the at least one RS ID includes a first RS ID and a second RS ID, and the first RS ID and the second RS ID are associated with different CG configurations indicated by the at least one CG configuration ID.

12. The UE according to claim 7, wherein when the at least one computer-executable program is executed by the processor, the computer-executable program further causes the processor to:
- obtain an RSRP offset threshold from the RRC release message;
- measure the DL RS associated with the particular CG resource at a first time point to obtain a first RSRP value of the DL RS;
- measure the DL RS associated with the particular CG resource at a second time point to obtain a second RSRP value of the DL RS;
- determine the amount of RSRP change of the DL RS by calculating a difference between the first RSRP value and the second RSRP value; and
- determine that the TA value for the particular CG resource is valid in a case that the amount of RSRP change is less than, or equal to, the RSRP offset threshold; and
- determine that the TA value for the particular CG resource is invalid in a case that the amount of RSRP change is larger than the RSRP offset threshold.

* * * * *